March 3, 1942.    J. C. WHITESELL, JR., ET AL    2,275,038
AIRPLANE WING
Filed Aug. 10, 1938    13 Sheets-Sheet 9

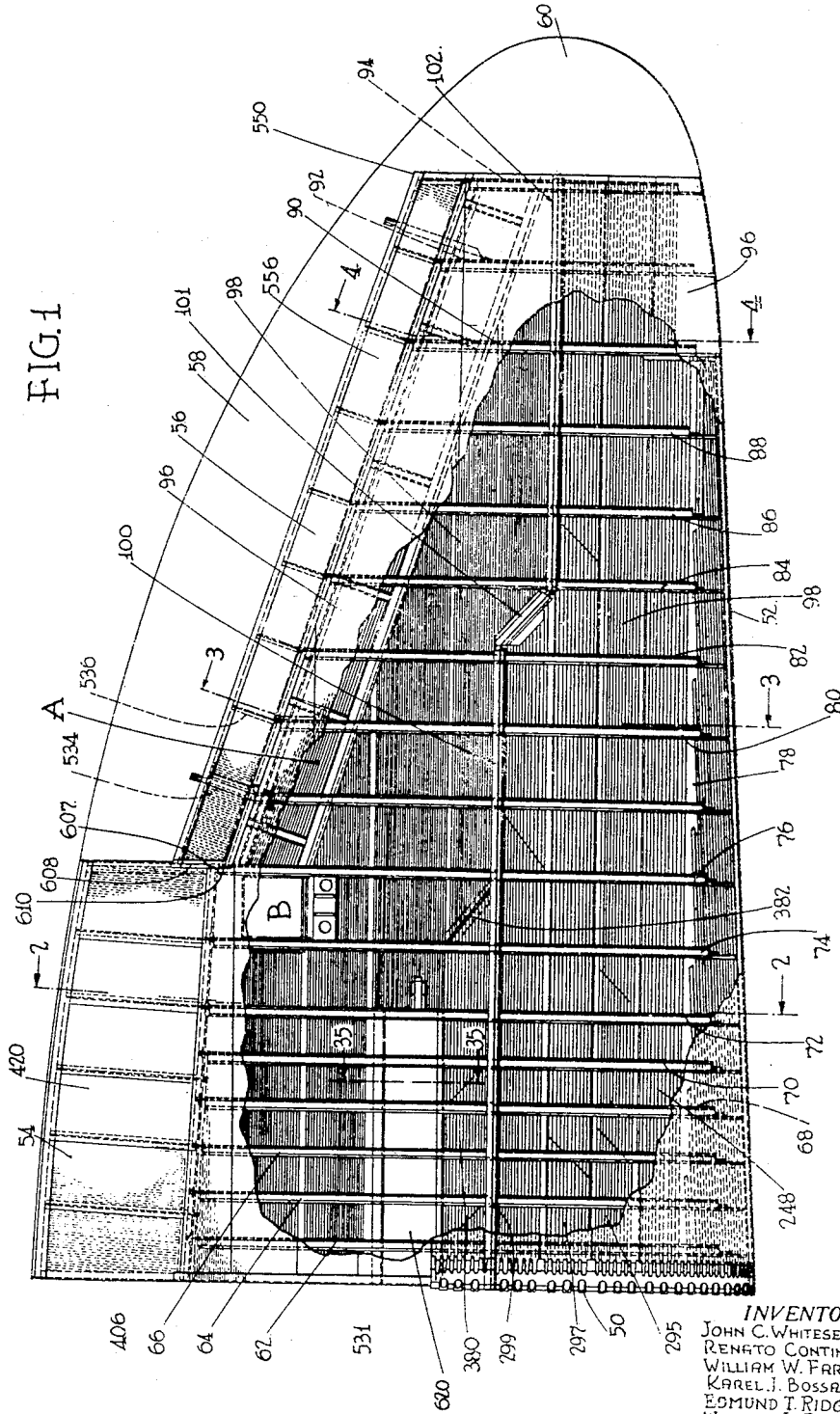

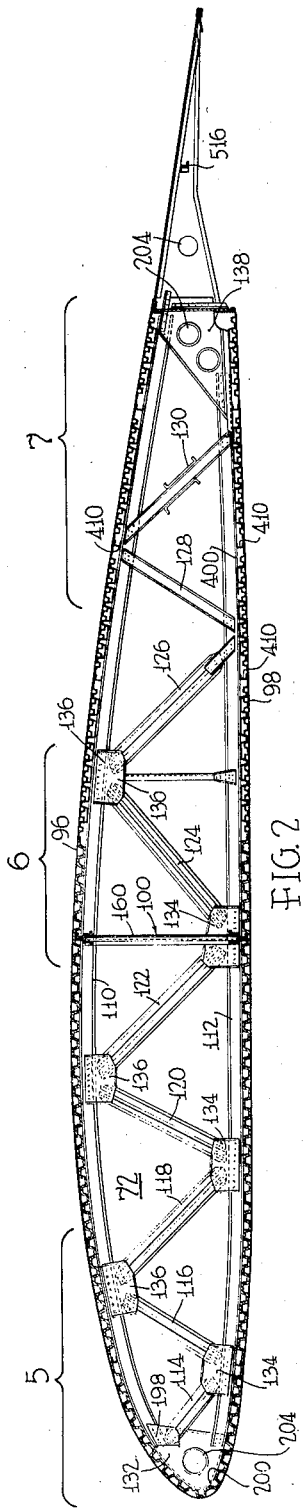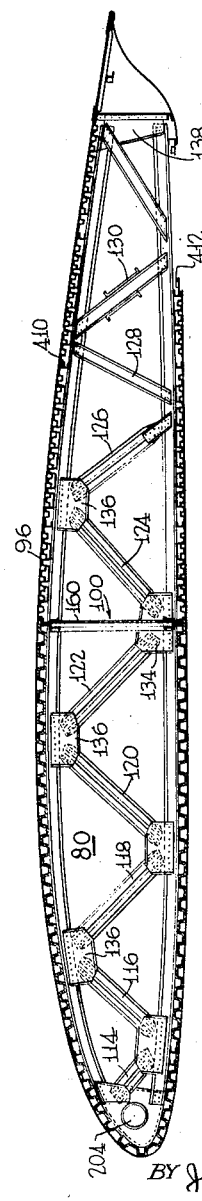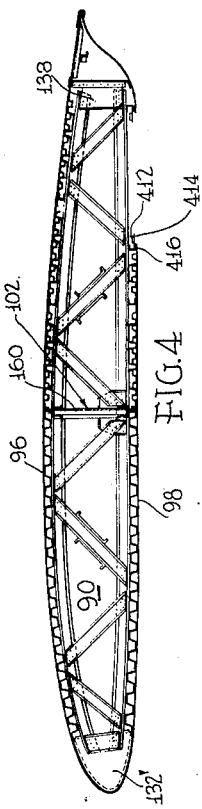

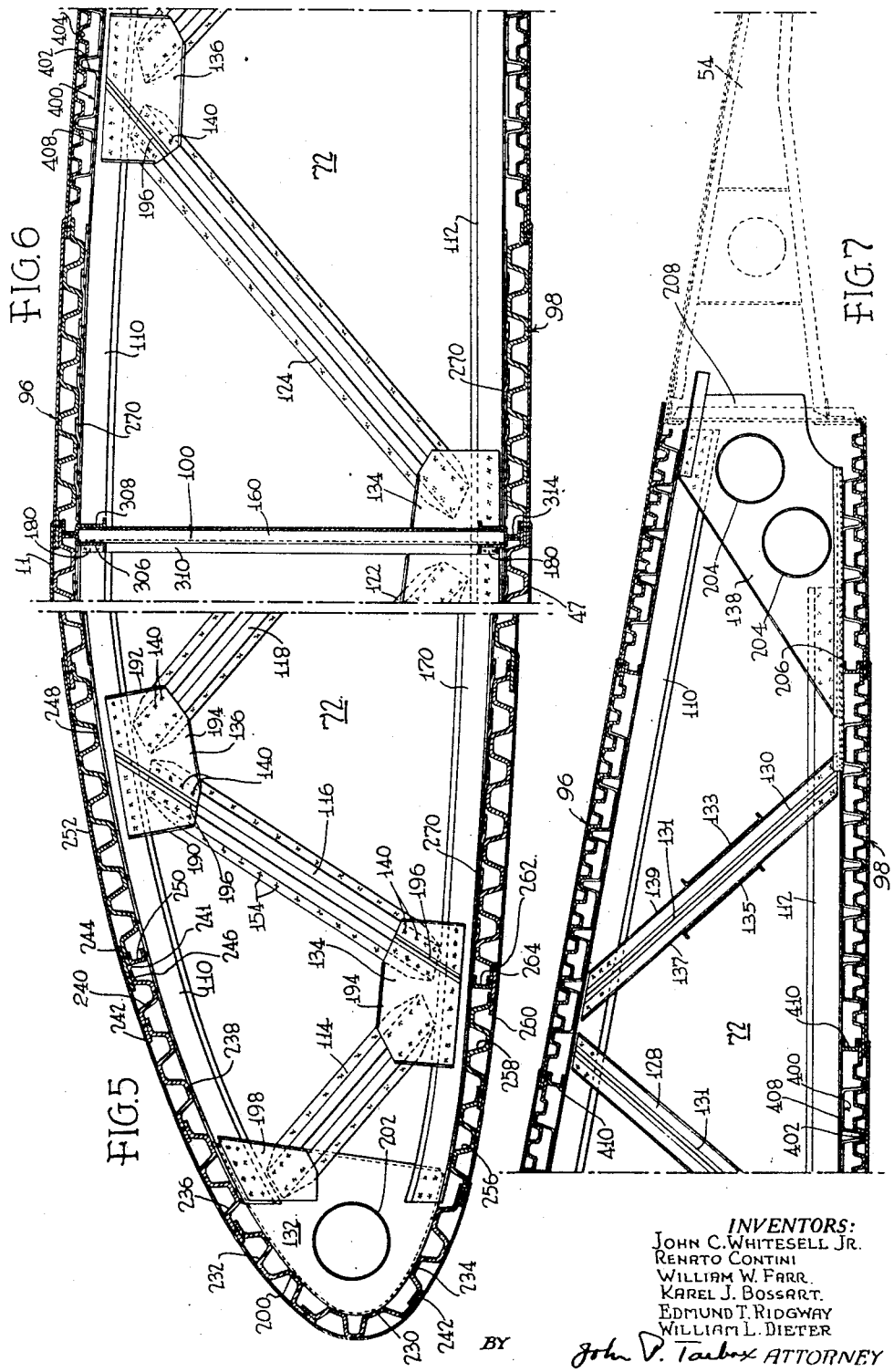

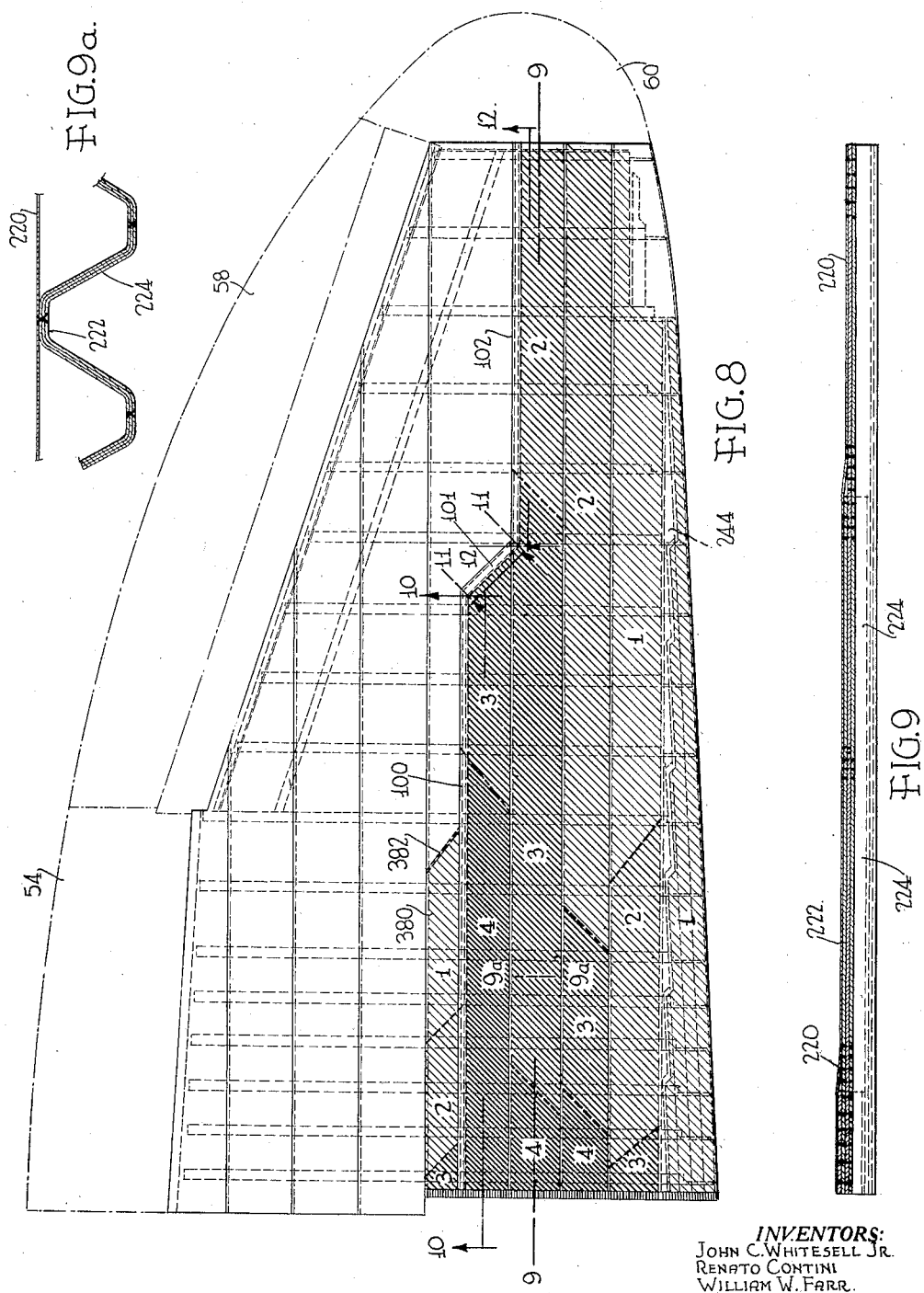

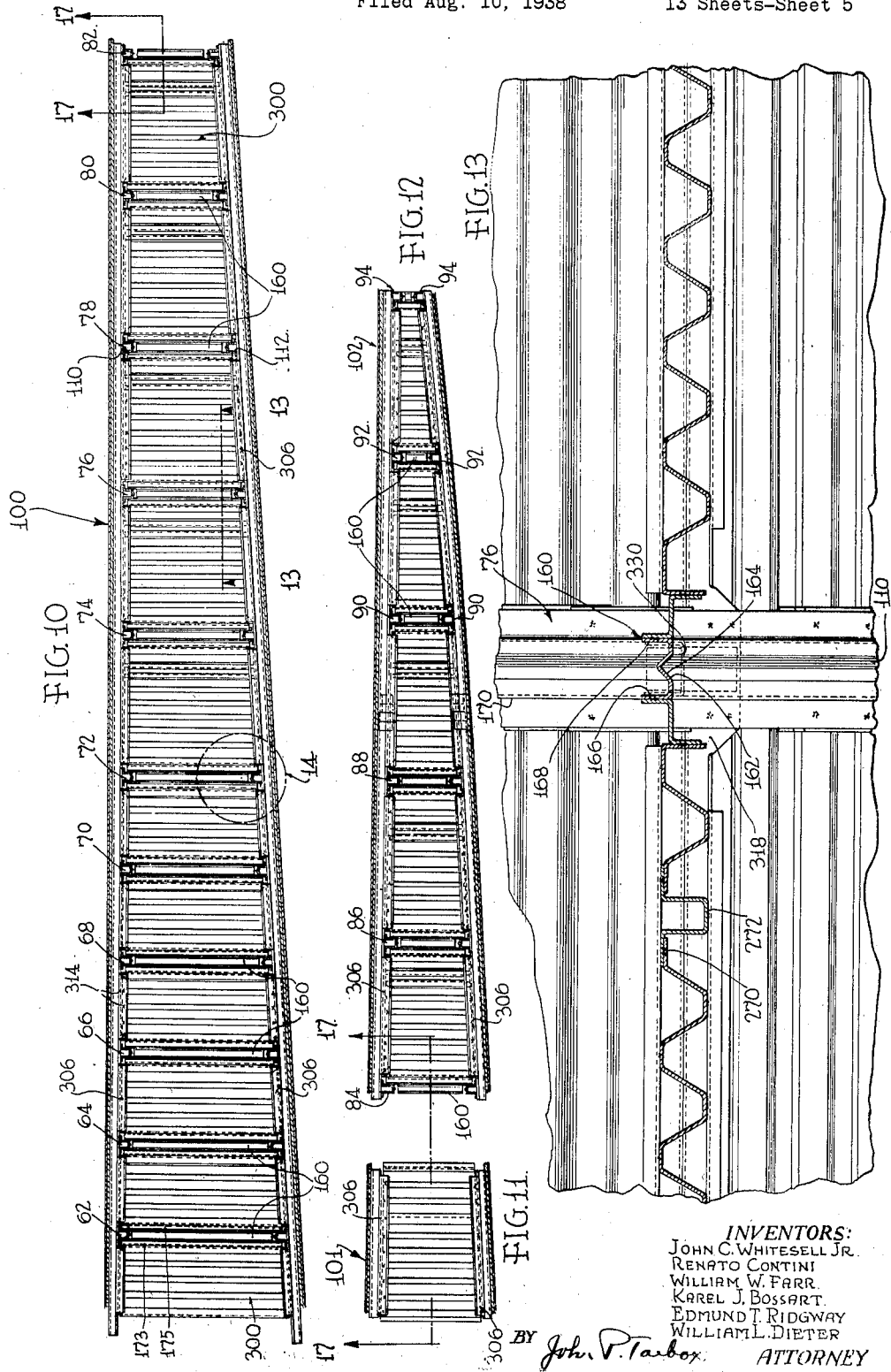
March 3, 1942. J. C. WHITESELL, JR., ET AL 2,275,038
AIRPLANE WING
Filed Aug. 10, 1938    13 Sheets-Sheet 5
INVENTORS:
JOHN C. WHITESELL JR.
RENATO CONTINI
WILLIAM W. FARR
KAREL J. BOSSART
EDMUND T. RIDGWAY
WILLIAM L. DIETER
BY John P. Tarbox
ATTORNEY

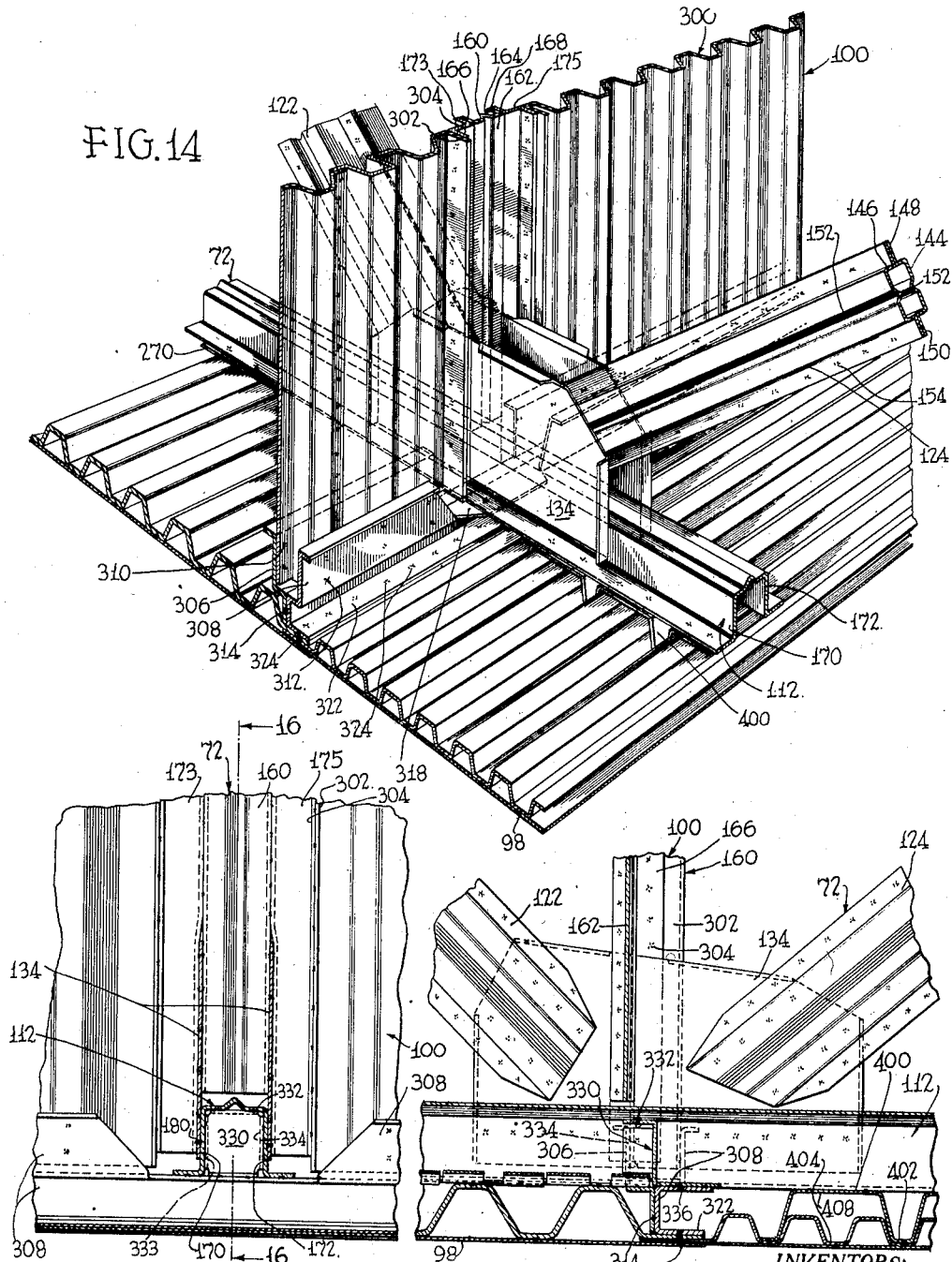

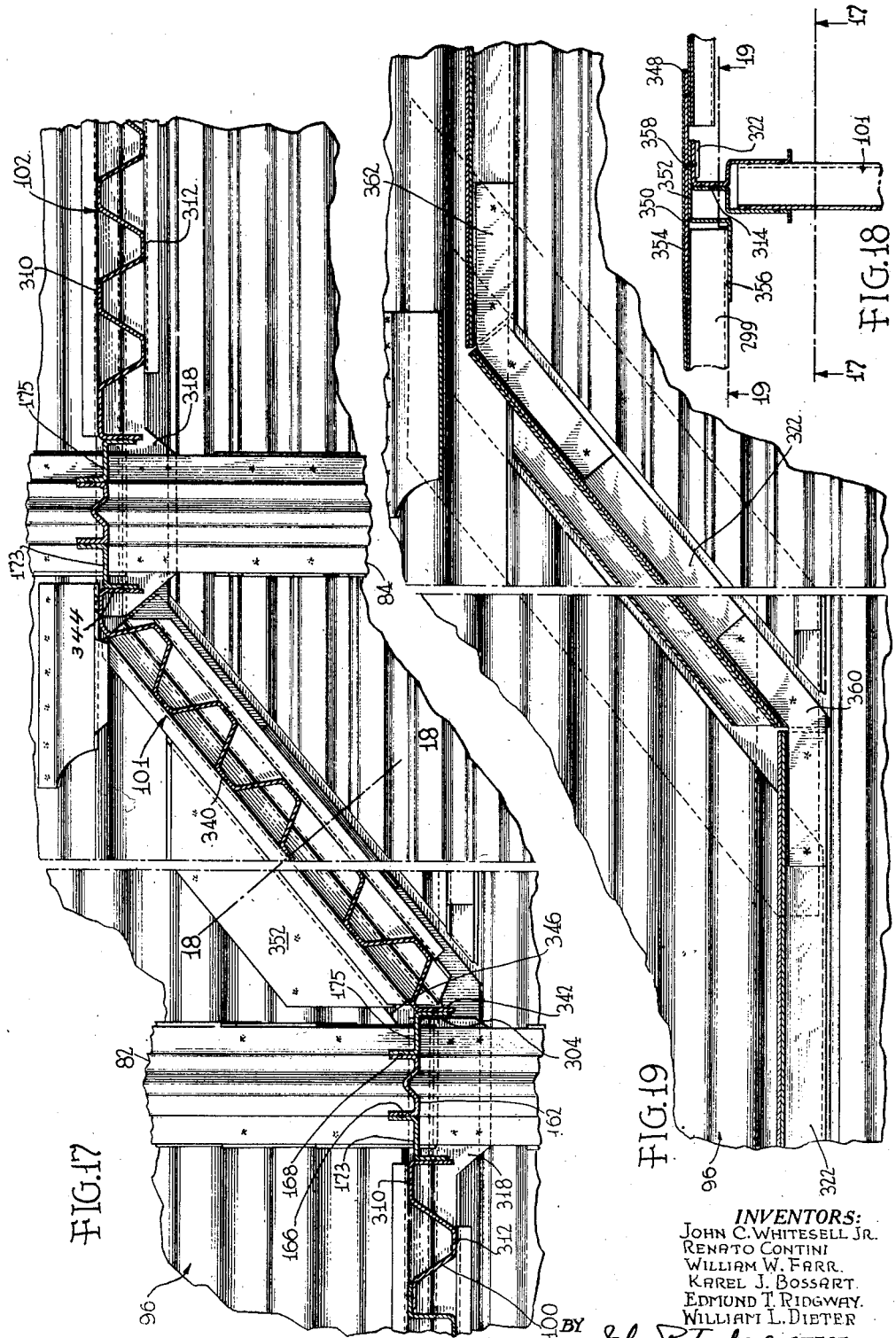

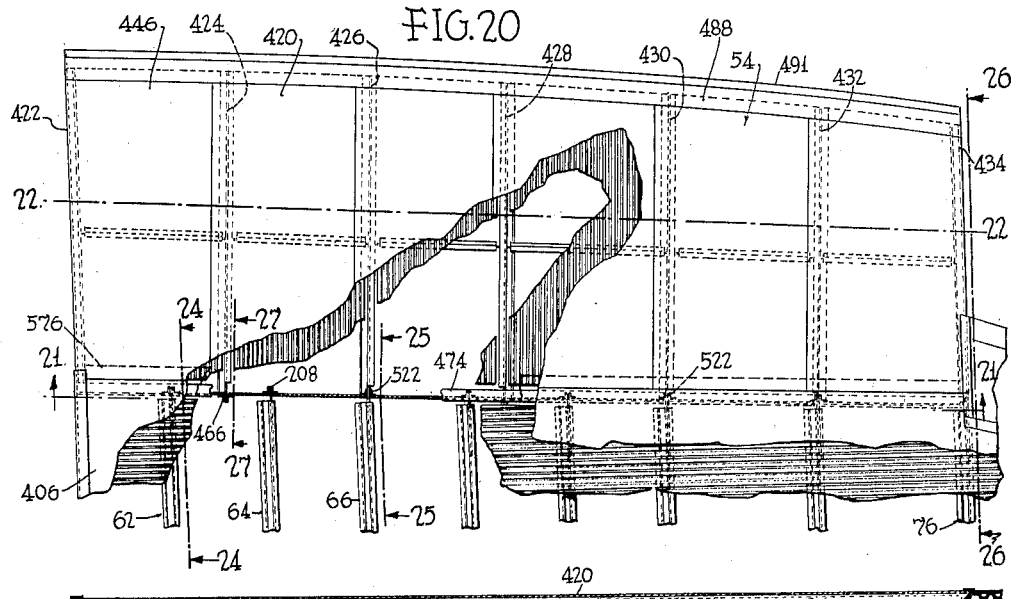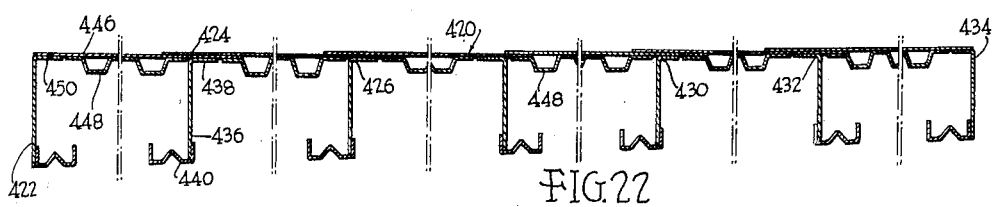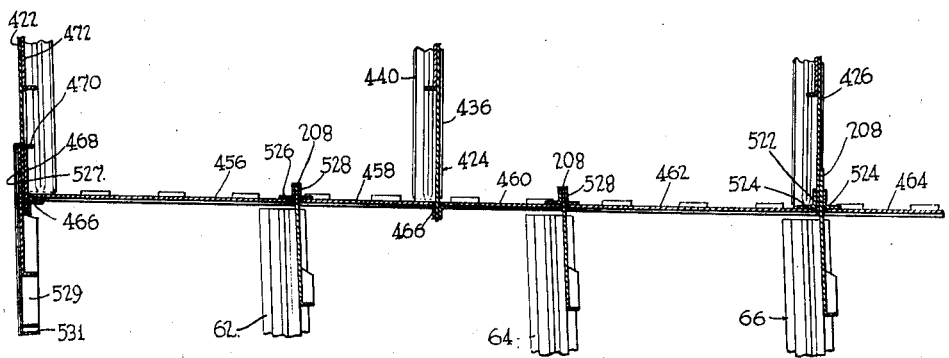

INVENTORS:
JOHN C. WHITESELL JR.
RENATO CONTINI
WILLIAM W. FARR
KAREL J. BOSSART
EDMUND T. RIDGWAY
WILLIAM L. DIETER
BY John P. Talbot ATTORNEY

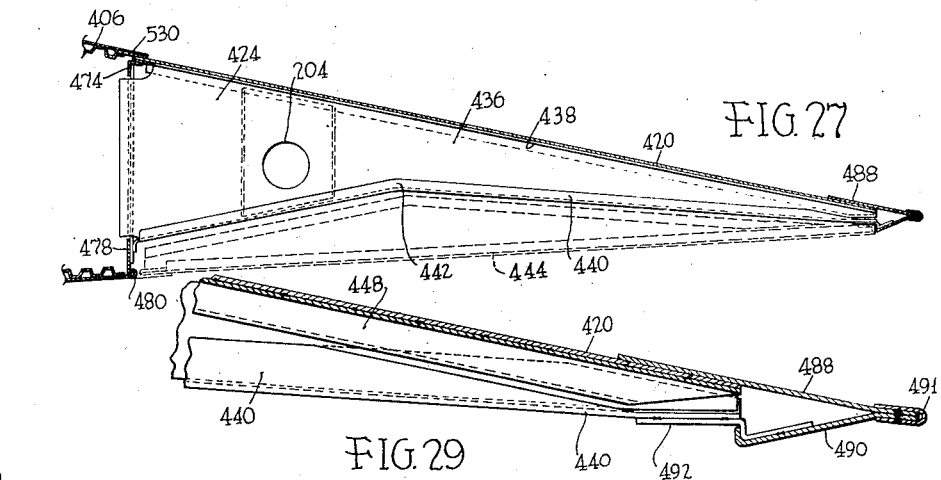
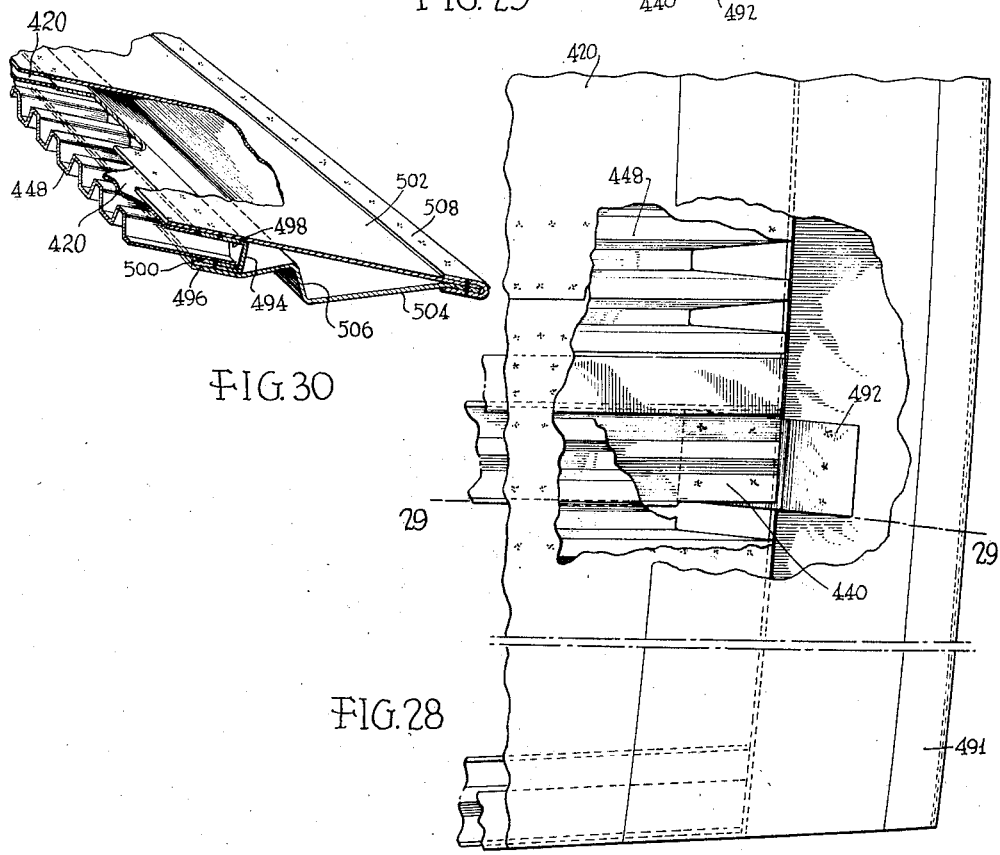

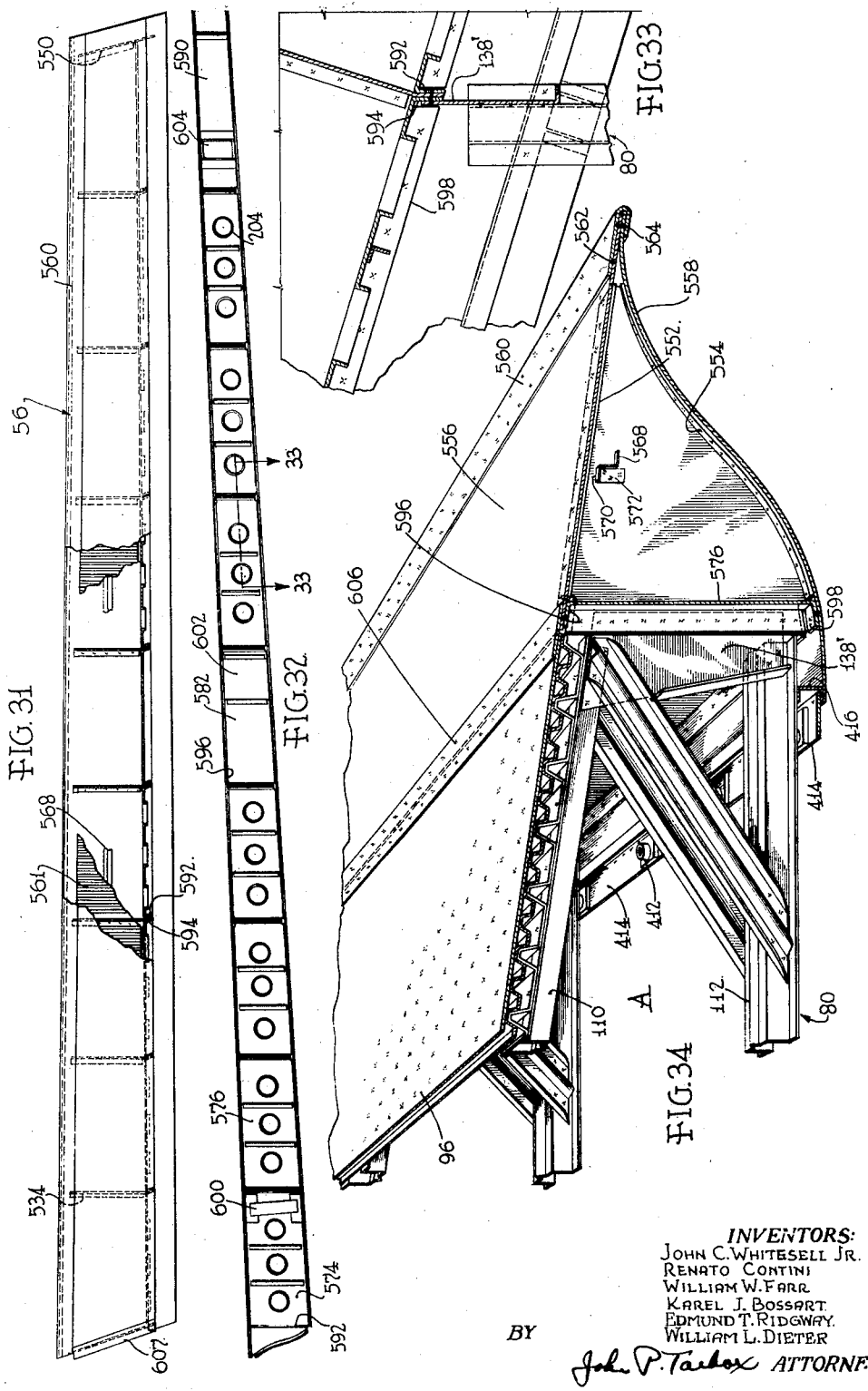

March 3, 1942.  J. C. WHITESELL, JR., ET AL  2,275,038
AIRPLANE WING
Filed Aug. 10, 1938  13 Sheets-Sheet 12

INVENTORS:
JOHN C. WHITESELL JR.
RENATO CONTINI
WILLIAM W. FARR.
KAREL J. BOSSART.
EDMUND T. RIDGWAY.
WILLIAM L. DIETER.

BY John P. Tarbox ATTORNEY

March 3, 1942. J. C. WHITESELL, JR., ET AL 2,275,038
AIRPLANE WING
Filed Aug. 10, 1938 13 Sheets-Sheet 13
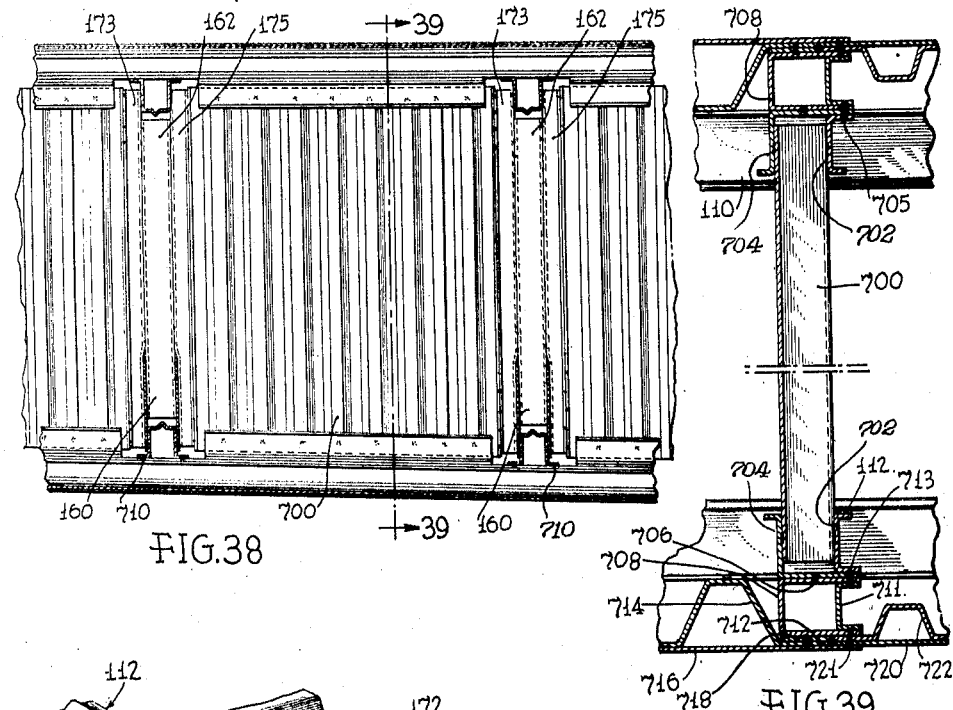
FIG.38
FIG.39
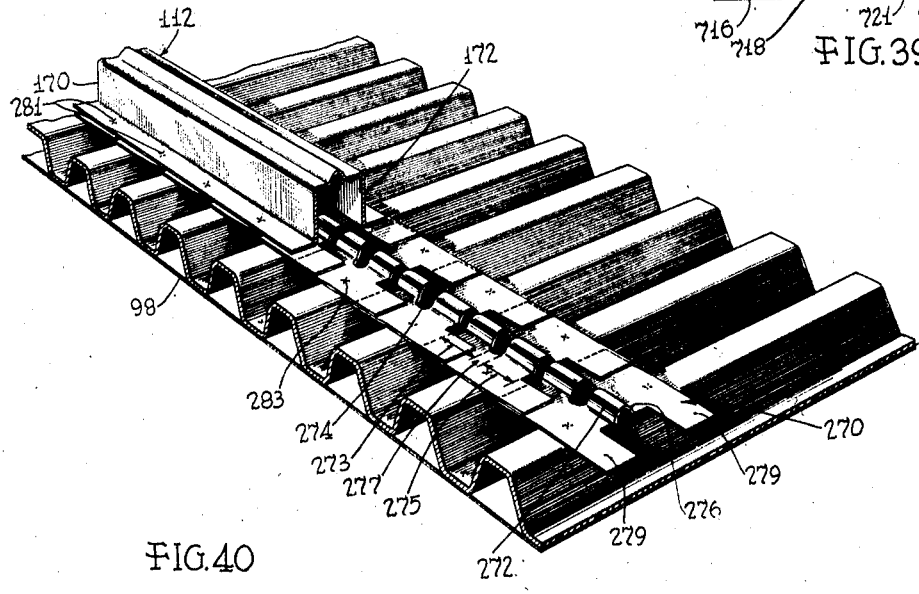
FIG.40
INVENTORS:
JOHN C. WHITESELL JR.
RENATO CONTINI
WILLIAM W. FARR.
KAREL J. BOSSART.
EDMUND T. RIDGWAY
WILLIAM L. DIETER
BY John P. Tarbox ATTORNEY Patented Mar. 3, 1942

2,275,038

UNITED STATES PATENT OFFICE 2,275,038

AIRPLANE WING

John C. Whitesell, Jr., Norristown, Renato Contini, Philadelphia, William W. Farr, Penn Valley, and Karel J. Bossart, Philadelphia, Pa., and Edmund T. Ridgway, Oaklyn, N. J., and William L. Dieter, Philadelphia, Pa., assignors to Edward G. Budd Manufacturing Company, Philadelphia, Pa., a corporation of Pennsylvania Application August 10, 1938, Serial No. 224,084

32 Claims. (Cl. 244—123)

This invention relates to aircraft wings and more particularly to the fabrication and structure of such wings formed from sheet metal. The invention further has to do with the fabrication of a wing structure from high tensile strength stainless steels, and the use of electric welding as substantially the sole fastening means throughout.

More specifically the invention relates to the improvement of stressed skin wing structures, and the utilization of stainless steel in connection therewith, which material has greater strength than other materials heretofore employed in aircraft wing construction. Further, the improvement is in part dependent upon the employment of new structural shapes of metal and particularly in new combinations thereof spot welded together in a manner to provide a wing having great advantages in strength, lightness, appearance and durability.

In wings of the cantilever stressed surface type, the upper wing surface is normally under compression, while the lower surface is under tension. Unless one or more spars of considerable weight and strength are employed, considerable difficulty is experienced in providing a wing surface structure capable of undergoing the high compressive and buckling stresses encountered; especially during aircraft maneuvers when stresses become a maximum and either the upper or lower wing surface may become the compressive member.

Since the principal stresses upon a wing occur mostly in the forward half, the construction thereof is of extreme importance. By providing a shear web running adjacent the rear of the forward half, and constructing the skins so as to blend into the shear web and additionally in effect provide a forward shear web in the leading edge, a box of D section results. Such a section resists torsion and permits a maximum of advantage in lightness and strength.

It is accordingly an object of the present invention to provide an improved metal wing having a skin structure including laminated corrugated metal, so correlated with a shear web and the wing nose as to provide sufficient strength, and rigidity to resist the stresses imposed, and all with due regard for maximum lightness.

Another object of the invention is to provide an improved wing structure having a rib structure, shear web, and skin structure so correlated as to provide a maximum of strength and rigidity and yet of a minimum weight.

A further object of the invention is to provide in a stressed skin wing structure, a skin, the strength of which varies from point to point in its ability to undergo compression and tension stresses in accordance with its position with relation to a shear web and the leading edge.

A still further object of the invention is to provide in a stressed skin wing structure, a stressed skin surface in conjunction with a corrugated stiffening member secured thereto, with a strength which is graduated in accordance with its position with relation to a shear web.

A yet further object of the invention is to provide in a stressed skin wing structure, a stressed skin which varies in its strength dependent upon its relation to the wing nose.

Another object of the invention is to provide a method of constructing and assembling a wing structure, whereby electric welding may be employed as a fastening means substantially throughout.

Yet another object of the invention is to provide a yielding attaching means for securing the skin to the ribs, both capable of resisting vibration fatigue as well as capable of easy affixation to both skin and ribs by spot welding.

Still another object of the invention relates to the method of fabricating a wing in a plurality of subsections for subsequent assembly in the wing structure.

The above and many other novel features of the invention will appear more fully hereinafter from the following detailed description when taken in conjunction with the accompanying drawings. It is expressly understood, however, that the drawings are employed for purposes of illustration only and are not designed as a definition of the limits of the invention, reference being had for this purpose to the appended claims.

In the drawings wherein similar reference characters refer to similar parts throughout the several views:

Fig. 1 is a top plan view of the wing with the top surface cut away to expose the inner arrangement;

Fig. 2 is a section taken through Fig. 1 adjacent one of the longer ribs on the line 2—2;

Fig. 3 is a section taken through Fig. 1 adjacent one of the intermediate ribs and on the line 3—3;

Fig. 4 is a section taken through Fig. 1 adjacent one of the shorter ribs on the line 4—4;

Fig. 5 is an enlarged view of zone 5 of Fig. 2;

Fig. 6 is an enlarged view of zone 6 of Fig. 2;

Fig. 7 is an enlarged view of zone 7 of Fig. 2;

Fig. 8 is a diagrammatic top plan view of the wing, especially illustrated to show the surface paneling and to indicate the variation in or graduation of layers of the corrugated strips lying immediately therebehind;

Fig. 9 and Fig. 9a are sections taken on line 9—9 and 9a—9a of Fig. 8;

Fig. 10 is a section taken on the line 10—10 of Fig. 8 and showing the rear portion of the shear web in its assembled relation.

Fig. 11 is a section taken on the line 11—11 of Fig. 8 showing the offset portion of the shear web.

Fig. 12 is a section taken on the line 12—12 of Fig. 8 showing the tip portion of the shear web;

Fig. 13 is a section taken on the line 13—13 of Fig. 10 showing shear web assembly details.

Fig. 14 is a perspective view of a section of the wing surface, shear web and rib located at the circle 14 of Fig. 10;

Fig. 15 is an enlarged view of a portion of the shear web of Fig. 10 located within the circle 14;

Fig. 16 is a section of Fig. 15 taken on the line 16—16;

Fig. 17 is a divided sectional view of a shear web at its offset portion and is taken substantially on the line 17—17 appearing in the end portion of Fig. 10, Fig. 11 and the adjacent end portion of Fig. 12, and also Fig. 18;

Fig. 18 is a section taken on the line 18—18 of Fig. 17;

Fig. 19 is a section taken on the line 19—19 of Fig. 18;

Fig. 20 is a detailed plan view partly broken away of the trailing edge assembly and adjacent portions of the main wing;

Fig. 21 is a section taken through Fig. 20 on the line 21—21 showing the attaching panel.

Fig. 22 is a section taken on the line 22—22 of Fig. 20 enlarged and with sections broken away;

Fig. 23 is an enlarged section taken on the line 23—23 of Fig. 21 showing the connection between the two ribs and the trailing edge showing a portion of the connection of the wing ribs with the trailing edge.

Fig. 27 is a section of Fig. 20 taken on the line 27—27;

Fig. 28 is an enlarged portion of Fig. 20 showing in detail the edge structure of the trailing edge;

Fig. 29 is a section taken on the line 29—29 of Fig. 28;

Fig. 30 is a perspective view, partly broken away, of a modified edge structure for the trailing edge;

Fig. 31 is a top plan view of the trailing edge adjacent the aileron, partly broken away;

Fig. 32 is a view of the aileron trailing edge looking toward the rear showing the rib attaching panel;

Fig. 33 is a fragmentary section of Fig. 32 taken on the line 33—33;

Fig. 34 is a fragmentary perspective showing the juncture between the aileron trailing edge and the wing proper;

Fig. 38 shows a modified construction of a shear web;

Fig. 39 is an enlarged section of Fig. 38 taken on the line 39—39, and

Fig. 40 is a perspective view of a portion of surface structure and rib cap strip to illustrate the attaching clip.

Figure 24:
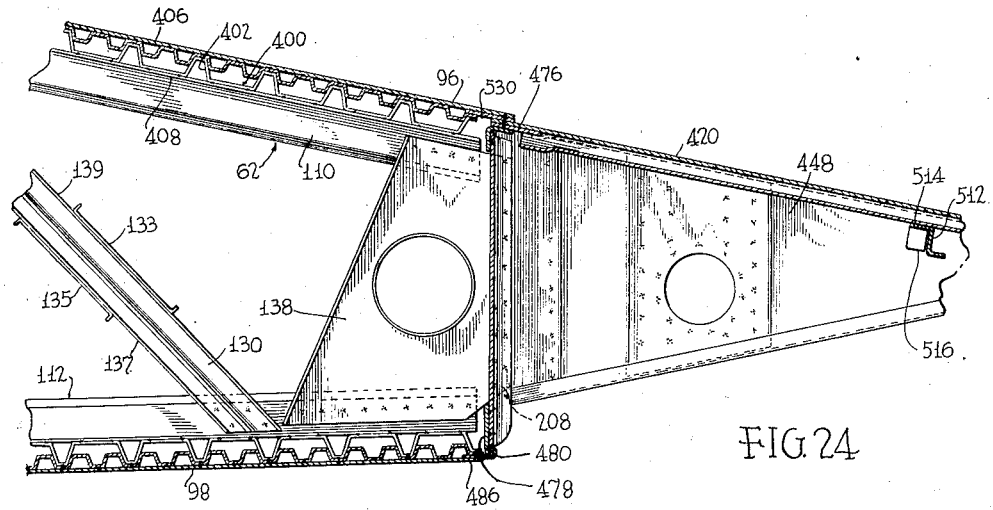
Fig. 24 is an enlarged section through Fig. 20 taken on the line 24—24.
Figure 25:
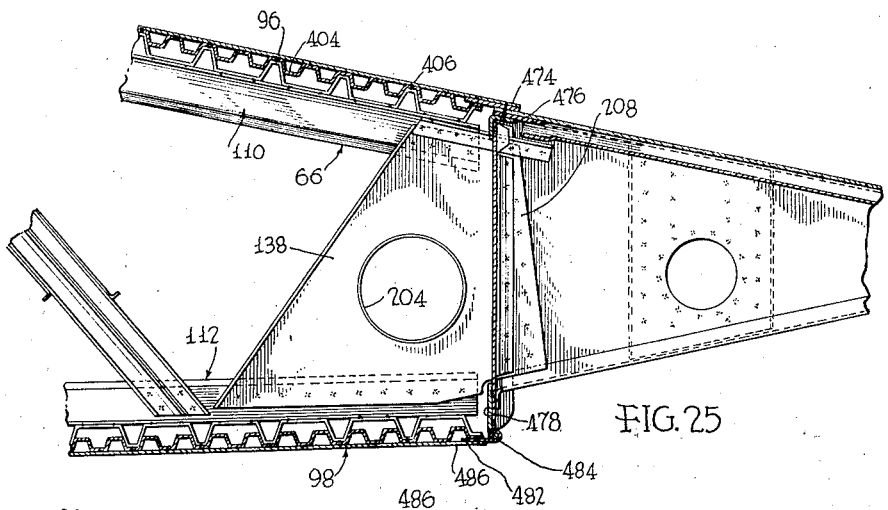
Fig. 25 is an enlarged section of Fig. 20 taken on the line 25—25.
Figure 26:
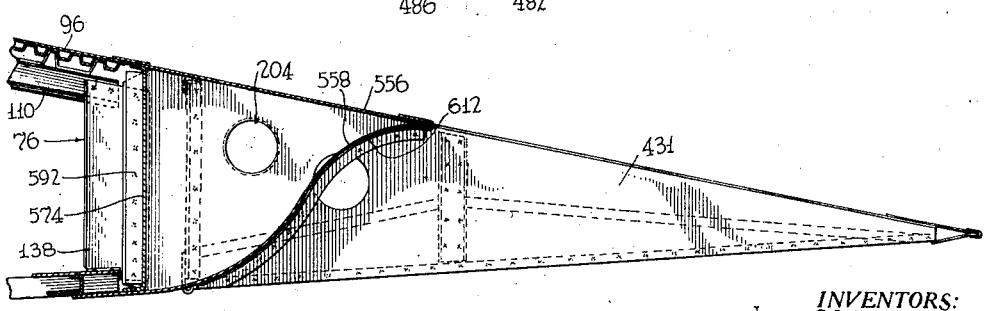
Fig. 26 is an enlarged section taken through Fig. 20 on the line 26—26 just beyond the end of the trailing edge.

Referring to the drawings and particularly to Fig. 1 wherein a plan view of the wing is shown with the top surface broken away, there will be seen a wing having an attaching means 50 at the root or inboard end thereof, a leading edge 52, trailing edge 54 for housing a trailing edge flap, and a trailing edge 56 adapted to cooperate with an aileron 58, roughly shown in outline form together with a tip 60.

The wing structure itself is made up of a plurality of transverse ribs 62-94 inclusive joined together by top and bottom surface structures 96 and 98 and a shear web 100 extending substantially longitudinally through the wing but having an offset portion 102 joined by an offsetting section 101 for the purpose of maintaining the web central.

Referring to Figs. 2, 3 and 4 wherein specific ribs 72, 80 and 90 are shown in some detail, as illustrative of the general rib structure, there will appear, for example in Fig. 2, top and bottom cap strips or chord members 110 and 112 tied together by diagonal braces 114 to 130 inclusive, the forward end of the rib being provided with a plate 132 having a flanged edge 200 providing a proper contour for the leading edge of the wing.

In Figs. 5, 6 and 7 the rib 72 of Fig. 2 is illustrated by way of enlarged portions. The top and bottom cap strips 110 and 112 which are of hat shaped section (for example, see Figs. 14, 15 or 40) are joined together by the diagonal braces 114—130 either directly or through the medium of gusset plates 134 and 136 or through the forward or nose plate 132 or equivalent rear plate 138 at the trailing end of the rib. The gusset plates 134 and 136 are welded to the diagonal braces as is shown at 140 and the plates are in turn welded to the side walls 170 and 172 of the cap strips 110 and 112. Diagonal braces 114—126 have a transverse section such as is shown in Fig. 14 and are composed of a pair of channel members 144 and 146 having welding flanges 148 and 150 and some form of strengthening groove or channel 152 extending the length of the channel members. In preferred practice the gusset plates 136 and 134 are welded to each half of the strut, and the halves are thereafter spot welded together along the strut flanges at uniformly spaced intervals as is indicated at 154, and thereafter the plates are spot welded to the side walls 170 and 172 of the cap strips, a cross section of the cap strip being clearly shown in Fig. 15 as well as Fig. 40. The diagonal braces 128 and 130 at the rear portion of the rib require less strength and are shorter and may be formed simply of channel members welded to the side walls of the cap strips 110 and 112, as is shown in Fig. 7. The diagonals 128 and 130 may be strengthened by central ribs 131 and flanged plates 133 and 135 may be welded to the flanges 137 and 139 of the spaced diagonals; it being understood that a diagonal is composed of two spaced members arranged in face to face relation on the opposite sides of the cap strips.

It will be understood that in constructing ribs for the various positions in the wing and for various sizes of wings, that various forms of diagonal braces and nose and rear plates and various combinations of those forms of diagonal braces may be employed depending upon the calculated strength required as well as observations in practice and tests. For example in Fig. 4 where the wing section has become relatively small, the diagonal braces are of the channel type shown at 128 and 130 in Fig. 2. Also where a brace is to be placed under compressive loads, for example brace 130, stiffening plates 133 and 135 are employed, but where the brace is only under tension, no such stiffening is required. Also referring to Fig. 4, the nose plate 132' will be seen to extend to the wing skin, the nose at this point having become so sharp that no room for corrugated backing exists.

In each of the ribs there is provided a vertical strut 160 centrally located which is to perform, in the assembled wing structure, a portion of the shear web. This vertical rib is shown in detail in Fig. 6 and Figs. 14 and 15. The strut proper comprises merely a channel member 162 of a cross section similar to the diagonals 128 and 130 and includes a central stiffening rib 164 and side flanges 166 and 168 which are so spaced as to line up flush with the side walls 170 and 172 of the cap strips 110 and 112. Where the channel member 162 joins the cap strips adjacent diagonal struts as appears in Fig. 6, adjacent the lower cap strips the side or gusset plates 134 which are welded to the diagonal braces 124 are also welded to the channel member flanges 166 and 168. To each flange 166 and 168 of the channel member 162 are secured Z-section members 173 and 175 which are welded at uniformly spaced points along one flange to the channel member flanges 166 and 168 and where the plates 134 appear, the Z-shaped members are sprung to accommodate the plate thickness and are spot welded to both the plates and to the flanges of the channel member 162. The Z members are also welded at either end to the side walls of the cap strips 110 and 112, the latter through the gusset plates 134 as appears in Fig. 15 at 180, and also in Fig. 6. The channel member 162 and the Z-shaped members 173 and 175 form together a portion of the shear web eventually to be assembled together and which extends sparwise throughout the wing. Consequently each rib as it is assembled into a unit for ultimate final assembly must have its shear web portion comprising the strut 162 and Z members 173 and 175 correctly aligned in position so that in final assembly the channel members of all ribs will lie in the same plane, except of course for the offset portion hereinafter to be described in more detail. As will be appreciated, the spot welds in all cases where possible are uniformly spaced in a sufficient number to adequately carry all stresses for which the parts are designed.

In the construction of the ribs, the gusset plates which are employed to attach the diagonal braces to the cap strips are flanged as at 190, 192, 194 and other points wherever practicable in order to stiffen and render the same stronger. The plates may also be provided with a stiffening rib such as shown at 196 which may also add considerable to the strength of the member when in assembled relation, the stiffening rib generally being aligned with the rib in the diagonal to which the plate is secured, but being opposed thereto. Such ribs are placed where the diagonals are under compressive loads. The nose plate 132 is, as shown in Fig. 5, spot welded to one side wall of the cap strips and cooperates with a gusset plate 198 to form a connection between the cap strip and the diagonal 114 which is electrically welded to both the gusset 198 and the plate 132. The nose plate is provided with a flange 200 and has a flanged hole 202 therein rendering the same lighter and at the same time affording some stiffening. At the trailing end of the rib, the plate 138 is likewise spot welded to the side walls of cap strips 110 and 112 and provided with similar flanged stiffening holes 204. In order to strengthen the lower cap strip 112 and to permit its termination short of the end of the rib to permit installation of controls which would interfere with the cap strip, a channel member 206 is provided, the channel of which is sufficiently wide to include the cap strip and both flanges to which it is welded. Plate 138 has a tongue portion 208 which extends for a short distance beyond the end of the rib, the purpose of which is to secure the trailing edge subassembly 54, the details of which will be hereinafter described.

The wing-surface structure which is to be secured around a plurality of ribs comprises a combination smooth skin sheet spot welded to the nodes of corrugated backing material. The corrugated metal has considerable strength in tension and is arranged with corrugations extending spanwise thus providing good resistance against buckling when placed under compression and when combined with the skin spot welded thereto at frequent and uniform intervals a rigid structure results. In order to increase the compression and tension strength at the inboard end of the wing where the stresses are greater, the corrugated material is laminated and the number of layers increased. For example, referring to Fig. 8 wherein a diagrammatic layout of the skin surface is shown, the shear web is indicated at 100, 101 and 102 and the various layer thicknesses correlated with respect to the shear web are shown. In building up the wing surface, the surfacing is applied in strip form extending from wing root to wing tip and comprising a continuous smooth skin sheet spot welded to the laminated corrugated member immediately there underneath. Each strip may be in the neighborhood of six or eight inches in width and its edges, as will hereinafter appear, are arranged for lap welding with the edges of the adjacent strips. The number and width of strips may be varied to suit convenience and wing size. The principal stresses encountered in the wing of the type herein disclosed take place in the forward half of the wing, that is the portion of the wing around and forward of its maximum thicknesses. Consequently, the trailing edge of the wing acts more or less as streamlining and does not need to have the ability to handle the excessive strains imposed upon the forward half. For this reason the trailing portion of the wing is made up of a skin surface backed by corrugated material of a single thickness, the corrugations of which are considerably smaller in amplitude and therefore lighter and which corrugated material is merely of a stiffness to prevent the diaphragming effect of an unstiffened wing surface.

Referring to Figs. 8 and 9, the numbers appearing in the cross hatched portion indicate the number of thicknesses of corrugated material employed in the section bounded by the broken lines shown. For example, the corrugated strip on the trailing side of the shear web starts off at the root with three thicknesses, reduces to two, and then to one and even terminates about one-third of the way toward the tip of the wing. Beyond this point the surface structure comprises the skin and the light weight corrugated material which has been described as being used throughout the trailing portions of the wing surface. On the other side of the shear web toward the leading edge, the first strip of wing surfacing is shown as comprising four layers of corrugated material which extend over one-third the distance throughout the wing and thereafter reduces to three layers, this strip terminating with the offset 101 shown in the shear web. The next or second strip commences with four layers of corrugations which extend but a short distance, thereafter changes or feathers to three layers and just beyond the offsetting section 101, reduces to two layers. The next or third strip commences with four layers, extends a distance slightly shorter than the four layers of the previously described strip and the three layer section extends less than one-third of the distance toward the tip of the wing, thereafter reducing to two layers. The next or fourth strip of material from the shear web commences with a short three layer section, reducing to two layers and thereafter to a single layer. The leading edge surface of the wing which is more remote from the shear web may be built up of material having but a single layer of corrugation as will be described hereinafter. Both top and bottom surfaces may be similarly arranged. In practice however, the lower surface, being more in tension, may be generally lighter.

Thus it will appear that as the stresses decrease from wing root to wing tip, the number of layers of corrugated material are reduced to correspond, thereby resulting in a structure as light as possible and yet having sufficient but graduated strength. It will also appear that as the distance from the shear web increases in the direction of the leading edge, the number of thicknesses also decreases since the strain on these members becomes somewhat less. Where each layer terminates, it is cut at an angle to feather into or toward the shear web and this is true of the first three cover strips. Since the leading edge, despite its curvature, acts as a shear web to a considerable extent, the fourth strip, which is immediately adjacent thereto is oppositely feathered, so that in effect, the thickness tends to increase again as the nose is approached. Because of shear stresses imposed upon the nose, it may in some cases be practical to employ greater thickness of material, or laminations. There is thus produced by this arrangement of layers in correlation with the shear web and the stresses encountered, a structure which is both light and yet as strong as is necessary to carry the load. Referring to Fig. 9 which is a section through the graduated layers, the skin surface is indicated at 220. It is spot welded to the nodes 222 of the corrugated backing material 224 which, as shown, varies in number of laminations from root to tip. In Fig. 9a a section is shown transverse of the corrugations to show the relative arrangement of the skin and backing material. It will of course be appreciated that in illustration the thicknesses of the metal used has been greatly exaggerated, this being true throughout the disclosure, it being in practice preferable to use to a considerable extent stainless steel sheets of .008 of an inch. However, where two thicknesses extend the entire strip length, a single thickness of .014 may be substituted.

In laying on the skin surface in practice, a complete set of suitable ribs are aligned in place in a jig and the covering preferably commences at the leading or nose end of the wing, since by so proceeding inside access for welding can always be arranged. However, if inspection doors are to be provided, assembly may start from the center and work both ways, since access for final welding is always possible through the inspection holes. In large scale manufacturing, greater speed could be obtained by the latter method. In the structure illustrated, however, the corrugated metal is preferably first laid in successive strips around the nose contour and thereafter a skin sheet is welded to the corrugations. As shown in Fig. 5, a strip of corrugation material 230 having two corrugations or ribs is bent and formed to fit around the nose and is welded to the flanges 200 of the rib nose plates 132. Thereafter additional two rib sections of corrugated metal 232 and 234 are secured to the nose plate flanges. Thereafter additional strips 236 and 238 are added to the ribs, the latter, however, being spot welded to the flanges of the cap strip 110. Because of the varying contour of the leading edge of the wing and because it is not very practicable to roll corrugated material having tapered corrugations, a special strip 240 of corrugated material cut along one edge 241 on the diagonal is applied next to the corrugated strip 238 and spot welded to the cap strip flanges. This strip is so cut and arranged that further strips of corrugated material may be added with all the corrugations extending in a direction substantially parallel with the shear web of the wing.

After the corrugated strips 230—240 are attached to the ribs, a skin sheet 242 may be welded to the nodes of the corrugations of the strips, it appearing obvious that the tip of the wing is open from the inside and outside so that by merely employing proper shaped welding electrodes, the welding is a simple matter. The corrugated members 230—240 are welded together at their overlapping points when laid upon the ribs, the welding being in the form of tack welds, just sufficient to hold the parts in place until the skin is applied. The spot welds which secure the skin to the corrugations are uniformly spaced approximately one-third or one-half inch apart and in order to provide welds at points where the cap strips and their flanges would interfere, special offset welding points are employed for reaching into the space provided by the corrugation. Thus no practical difficulty is encountered in securing the leading edge surface structure to the ribs. The lap joints between the adjacent corrugated sections heretofore described, and particularly those located along the cap strip portion of the ribs which do not have great curvature, may be adjusted in amount of overlap whereby the end corrugated strip 240 may be accurately aligned parallel to and correctly spaced from the shear web which hereinafter must be positioned in the same plane with the shear web struts 160 appearing in each rib.

Proceeding along the top cap strips of the ribs, such as 110, a further strip of corrugated material may be placed thereon, which strip is preferably joined to the corrugated strip 240 by means of a splice plate 244 inserted between the flange 246 of the corrugated strip 240 and the skin sheet 242. As has been previously described, the corrugations of the strips 238 and 240 do not extend parallel and are cut through on a diagonal and it is for this reason that the strengthening effect of a splice plate at this point is desired. The splice plate is further strengthened in its juncture with the corrugated strip 248 by a channel strip 250 which is spot welded to the cap strip flanges as well as to the splice plate 244 and the corrugated strip 248. The corrugated strip 248 is welded by its inwardly extending nodes to the flanges of the cap strips of the ribs throughout the length thereof and thereafter a skin sheet 252 is welded to the outward extending nodes in a manner similar to the skin sheet 242, previously described.

On the underside of the ribs, the corrugated plates 256 and 258 are secured in the same manner as the plates 238 and 240. The corrugated plate 258 is cut on a slant so as to leave an edge parallel to the shear web, yet to be assembled. The skin member 260 is applied by welding to the nodes of the corrugated members 256 and 258 and a splice plate 262 together with a strengthening channel 264 is provided in much the same manner as on the top surface.

Figure 35:
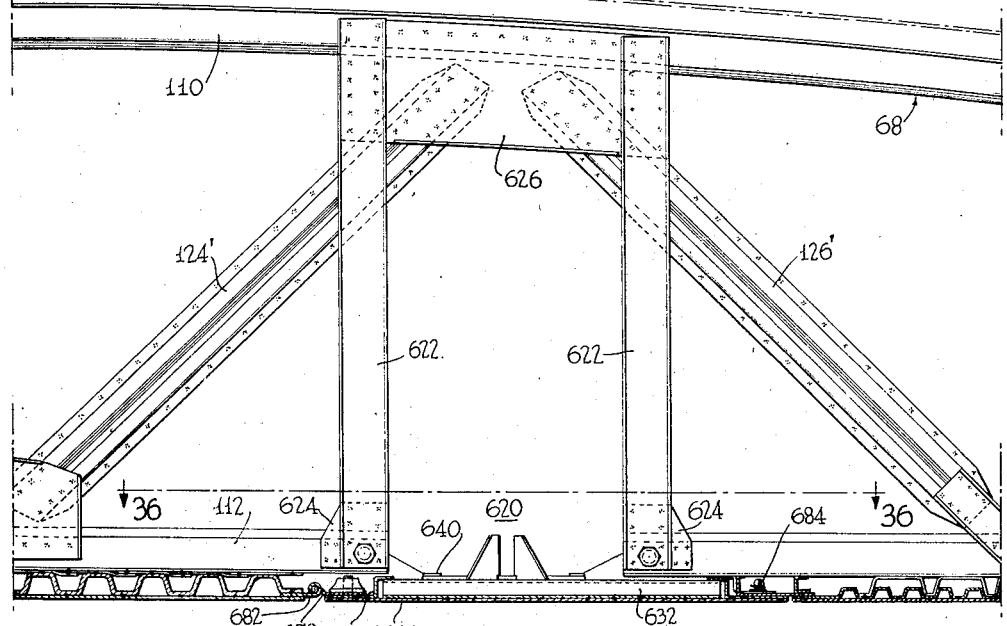
Fig. 35 is an enlarged section taken through the bomb rack on the line 35—35 of Fig. 1.

In order to facilitate the further application of covering structure and in order that the welds may be more uniformly made between the corrugated material and the skin, the skin and corrugated backing are first welded together into strip assemblies and thereafter secured to the rib cap strips. Since it is not practical in the present instance to reach within the nodes with a bar to weld the corrugated member directly to the cap strips after the skin is affixed to the corrugated member, although this can be done, it has been found especially desirable to provide a row of clips welded to the nodes of the inwardly extending corrugations which clips are arranged in lines substantially where they will engage rib cap strips when the surface structure is assembled on the wing. These clips appear in detail in Fig. 40 and in some detail in Figs. 35 and 37 as well as Fig. 15 and Figs. 5 and 6 and are indicated by the reference numeral 270. A perspective view of a series of clips is shown in Fig. 40 and each comprises a flat plate having a central rib 272 cut away in the central portion and at one end portion, as indicated at 274 and 276 to provide two short stiff portions 273 and 275 separated by a short flexible portion 277 and flexible end portions 279 for overlapping the adjacent clip. The flat portions on either side of the central rib are spot welded to the corrugation nodes and to the cap strip flanges. The distance from center to center of the stiff portions 273 and 275 is approximately one-half the pitch of the corrugated metal to which the clip is to be attached, so that as a series of clips are welded, one to each corrugation node as at 283, the overlapping portion 279 of one clip overlaps the stiff portion 273 of the adjacent clip, and when the cover strip is secured to the rib cap strip the center of these overlapped portions are spot welded together as at 281 and to the rib cap strip flanges simultaneously. Thus each skin section is prepared with clips with their ribs 272 aligned and extending in the direction of the cap strip and the clips are spot welded in place to the corrugation nodes. The skin may then be secured to the corrugated member and the assembly is placed in position upon the ribs and the clips welded to the rib cap strip flanges. As an alternative, the clips may be welded to the corrugated member after the skin is attached, by insertion of a bar electrode between the corrugation skin during clip welding. It has been found that this clip in addition to providing a facile method of attachment, also provides a certain amount of resiliency between the rib and the wing surface which is beneficial and which tends to prevent fatigue which might otherwise take place with the wing surface welded down to the rib and, for this reason, it may be desirable to secure even the nose or leading edge skin sections 230—240, 248, 256 and 258 to the ribs by this method as an alternative over the direct connection which has been heretofore described. The use of the clip makes it much easier to uniformly weld the skin surface to the corrugated backing and also permits more uniform welds to the cap strip which is likewise important in a structure of this type.

The series of attaching strips or clips in effect form a continuous beam extending from corrugation node to corrugation node and affixed to the cap strip midway therebetween. Thus each section of the clips extending from one node center to the next forms a beam which is loaded by the cap strip at its center and, because the clips extend in either direction beyond the node, it will be observed that the maximum bending moments appear at each node and at each point of affixation to the cap strip. It will be observed that the clips at these points are provided with the stiffening ribs 272 to facilitate the clip in handling the bending moment. The flexible portions 277 which appear between the stiff portions 273 and 275 in the assembly occur substantially at the points of no bending moment in the theoretical beam extending from node to node. Thus at the point of no bending moment the clip is provided with a resilient flexible section which operates to decrease the tendency of fatigue from vibration around the spot welds.

By welding the skin sheet to the corrugated backing prior to the latter's affixation to the wing ribs, it is possible to place the skin under slight stress while it is being welded to the corrugated member. This causes the skin to lie flat and gives a smooth appearance and makes up in part for the shrinking of the metal which takes place at each weld as it is being made. For example, in practice, a skin sheet is placed under a tension of approximately 10,000 pounds per square inch which, it will be understood, is a small fraction of the 185,000 pounds per square inch tensile strength of the stainless steel herein used for this purpose. This slight stress does not materially affect the strength of the corrugated skin structure and it has been found to be advantageous since without it, the skin surface between the rows of welds attaching the same to the corrugated backing member would become wrinkled and buckled and unsightly because of the shrinkage resulting from the upset metal at each weld, which after upsetting, cools and tends to cause contraction.

A plurality of strip assemblies of skin and corrugated backing with the attaching clips are placed upon the ribs and secured thereto one after another up to the point of the shear web. As indicated in Figs. 1 and 8, three strips of material 295, 297 and 299 are applied in this manner on the top surface after the corrugated strip 248. The third strip, however, terminates with the offsetting portion of the shear web indicated at 101.

At this point, the shear web is placed in position, the same comprising a plurality of panels, each one being of a correct size to exactly fit between the portions of the shear web formed by the struts 160 and the Z members 173 and 175 which were assembled with each rib. Each shear web panel comprises a corrugated member 300 provided with end flanges 302 which are adapted to engage the flanges 304 of the Z-shaped strips 173 and 175. The ends of the corrugated panels at top and bottom are received between members 306 and 308 together forming a channel, each of which is spot welded to the loops of the corrugated shear web panels 300. In the preferred practice, the shear web panels and the channel members 306 and 308 at top and bottom are assembled apart from the wing. The panels after being correctly spaced in a suitable jig or other device for the purpose are welded to the channel member 306 by the loops on one side of the corrugated web as at 310. Thereafter the channel 308 is welded to the other strip of loops as at 312 and the two channel members are welded together at 314. At the spaces between the shear web panels through which the ribs will extend when assembled, the side flanges of the channel members 306 and 308 are bent at right angles to form a flat bearing surface 318 for the rib cap strips and its flanges, as is particularly well shown in Fig. 14.

In Fig. 10 the shear web which extends from the root of the wing to the offset, is shown in its assembled position with reference to the ribs, the ribs having been inserted in the spaces between the individual panels 300. Thus the shear web panel assembly is readily positioned upon the ribs and slid to its proper position where the flanges 304 of the Z members 173 and 175 can be spot welded to the flanges 302 of the corrugated shear web sections. At the same time the flange 322 of the channel member 308 and the next strip of skin and corrugated backing are all welded together with the edge of the preceding skin and backing by a series of spaced welds as shown at 324 (see Fig. 14). In this manner, the shear web sections 300 together with the vertical struts 160 of the ribs become in effect an integral shear web extending through the length of the wing and become rigidly attached to the corrugated wing surface as well as to the ribs. The cap strip flanges of the rib, in fact, are welded to the portion of the side flange of the channel member 308 which has heretofore been described as providing a bearing 318 for the cap strip.

In order to strengthen the joint between the cap strip and the shear web flange members 306 and 308, and rigidify the right angle cross section of the cap strip, a bent piece of metal 330 is provided one side or portion of which is of the correct size and shape to fit within the cap strip internal cross section. This portion is provided with flanges 332, 333 and 334 adapted for spot welding to the top and side walls respectively of the cap strip all substantially in the plane of the shear web. The other portion of the angle piece is welded as shown at 336 to the bearing portion 318 of the shear web channel member 308.

The offset portion of the shear web is shown in some detail in Figs. 17, 18 and 19 and is of a structure quite similar to that heretofore described, except that it consists of a single panel 340 with edge flanges 342 and 344 which are arranged at substantially a 45° angle to the plane of the panel so that the flanges will cooperate with the Z-members 173 and 175 and their flanges 304.

In Fig. 17, which is a sectional view looking toward the underside of the top wing surface showing the manner in which the corrugated strip 299 terminates, at 346, just short of the position in which the offset shear web is placed and in Fig. 18, it will be observed that the skin of the corrugated strip assembly 299 extends to a position substantially beyond the position of the offset shear web panel, as shown at 348. A strengthening plate 358 of 45° parallelogram shape is inserted between the skin and the corrugated member of the assembly 299 and a stepped plate 352 is also provided in order to further reinforce the end of the corrugated member at this point. The step plate 352 is welded to the corrugation nodes at 356 prior to welding the end portion of the skin sheet, so that access is provided. Thereafter, the skin and plate 350 are spot welded to the corrugated member. The skin, plates 350 and 352 may thereafter be all welded together as at 358.

At this stage, it will appear obvious that the offset shear web panel may readily be inserted into position and the flange 322 welded to the plates also at the point 358. Obtuse flat angle plates 360 and 362 may be lapped upon the flanges 322 of the channel members 308 of the offset shear web panel and the adjacent shear web sections so as to strengthen the construction at these points. At this time the remaining shear web panels, shown in Fig. 12, may be assembled with channel strips and placed in position upon the ribs and secured in the same manner as the shear web assembly of Fig. 10, which has been heretofore described. Since the corrugated metal employed in the shear web panels may in some instances fail to have the correct pitch for an even number of corrugations between ribs, the panels may be cut as shown in Fig. 13 at 270 and a hat shaped section or single corrugations 272 of reduced pitch may be inserted, the same having such a pitch as will cause the end corrugations of the panel to be correctly positioned so that their flanges 302 will just nicely engage the flanges 304 of the Z-members 173 and 175.

After the shear web has been placed and secured by spot welding as hereinbefore described, the rest of the wing surface is applied. The wing surface assembly strip which lies adjacent to the shear web on the trailing side thereof has a section 380, as shown in Figs. 1 and 8 of coarse corrugated metal backing extending to the point 382 and from that point on, a lighter corrugated backing is employed. At the point 382 where the change in corrugated backing occurs, suitable reinforcing strips may be provided and the corrugated metal is preferably terminated on a diagonal feathering toward the web. As has been previously described, this assembly strip is welded to the shear web channel member flange 322 together with surface assembly strip 299 all at the same time and at the point indicated by 359.

The strips of covering material backed by the lighter weight corrugations of lesser pitch and amplitude are secured to the rib cap strips by a slightly different method partially because the amplitude of the corrugations is insufficient to extend to the cap strip flanges, the distance between the skin surface and the cap strip having already been determined by the larger corrugations used in the covering forward of the shear web. For this purpose a strip 400 is provided having narrow loops 402 bent into the strip and which loops are adapted to extend into the corrugations on the backside of the corrugated backing 404. The loops extend into every other corrugation and are welded to the corrugated backing and the skin 406 simultaneously. The flat portions 408 of the strip between the loops in turn can be readily welded to the flanges of the cap strip. Each strip of cover assembly is provided with these bent strips which have sufficient folds to extend across the corrugated member. Where the adjacent strips are fastened together or lapped, in order to render the joint more rigid and because of the lack of support of the attaching strip, channels 410 are provided, the flanges of which are welded to the skin and the cap strip flanges respectively.

The manner of completing the wing surface around the rib structure will appear obvious. On the underside of the wing, because of controls extending therethrough, it is necessary to provide an inspection hole and this is accomplished by leaving a blank space and providing the edge of the covering strips adjacent the blank spaces with some form of fastening means for fastening a cover panel thereto. The fastening means, as shown in Figs. 3 and 4, comprises internal threaded fittings 412 carried on a strip 414 secured to channel member 416 which channel member is arranged in a fashion very similar to previously described channel member 410. The strip, channel member flange and external skin are all spot welded together, while the corrugated stiffening terminates just short of the channel.

The trailing edge assembly is built up as a subassembly and the unit thereafter attached to the wing structure which has been so far described. Referring to Fig. 20 wherein a plan view of the trailing edge assembly is shown with the skin and corrugated backing partially cut away, there will appear a top panel 420 supported on a plurality of flanged rib members 422 to 434, which ribs extend fore and aft of the finished wing. The flanged rib member 424 is shown in detail in Fig. 27 and comprises a flat porton 436 having a top flange 438 and a bottom channel 440 secured by spot welds along the lower edge. In Fig. 22 the channels on the rib members 422—434 are shown in section and enlarged detail. The channel member 440 which extends along the lower edge of the panel 436 is bent at 442 so as to provide a suitable space to house a hinged flap 444, the details of which are not shown herein. The purpose of the flap, as is well understood in the art, is to assist in maneuvering, particularly in landing and taking off.

The top surface 420 of the wing flap cover, as is shown in Fig. 22 is made up of a series of panels extending from one adjacent flanged rib member to the next, each panel having a relatively light weight corrugated backing for stiffening. The panel 446, for example, has a corrugated backing 448 spot welded thereto along the nodes and suffices to stiffen the surface member 446. In assembling, the panel 446 is spot welded to the flange 450 of the trailing edge rib 442 and together with the next panel 452, is spot welded to the flange 438 (see Fig. 22) of the trailing edge rib 436 and so on to the end flanged rib 434.

The forward ends of the flanged ribs are then provided with a series of plates 456—464 having angle strips spot welded thereto on the forward side as, for example, at 466 which, in turn, are welded to the flanged rib members, for example 424. The end rib member 422 may be provided with a strengthening layer of metal 468 having a stiffening flange 470 interposed between the angle strip 456 and the rib surface 422 and other flanged stiffening members such as 472 may be provided to the ribs wherever need may appear. The plates 456—464 are joined together along their top edges by an angle strip 474 which, in turn, is attached to the trailing edge skin 420 and in connection therewith, a continuous reinforcing strip such as 476 may be employed, the same having been squeezed between the corrugated backing 448 and the skin 420. The lower edges of the plates 456—464 are connected together by a strip 478 which can be provided with a piano hinge part 480 along its lower edge. As shown in Figs. 23 and 21, the piano hinge has loops which altogether constitute about one-third of the length of the hinge, leaving space for two further sets of such loops, and, as shown in Fig. 27, it is contemplated that the trailing edge flap may be hinged at this point with one set of loops. A supporting plate 482 with another set of hinge loops 484 is provided for attachment to the lower wing surface 486 so that in assembly of the major portion of the wing and the trailing edge flap subassembly, the piano hinge may be employed to join the lower edges and at the same time provide a pivot for the hinged flap 444.

The extreme tip of the trailing edge may be finished off by providing a plate 488 spot welded to the trailing edge surface 420 which plate on its underside is welded to a flanged underplate 490 together with a U-section trim strip 491, the latter being reinforced by connection to the rib channels 440 through strips 492 spot welded to the channel and to the inside surface of the underplate 490.

An alternative tip structure is shown in Fig. 30 and comprises a U-section strip 494, the sides 496 and 498 of which are properly spaced for fitting over the end of the corrugations 448, and a bridge strap 500. In practice the bridging strap is first secured to the lower corrugation nodes by spot welding and the U-strip 494 thereafter spot welded to the top nodes and the bridge portions of the strap 500. Cover plates 420 abut the upper edge of the U-strip 494 and the top tip plate 502 overlaps the cover plates 420 and the top portion of the U-strip 494 and is welded to both by reaching in underneath to the undersurface of the top nodes. The under tip plate 504 which is provided with an offset 506 to receive the edge of the hinge flap 444 is welded to the U strip and the bridge strap 500 as will readily appear. The top and bottom tip plates 502 and 504 are thereafter secured together at their extreme edge by means of a U-section binding strip 508 which is spot welded in place.

In order to strengthen the trailing edge assembly in a spanwise direction, Z-sectioned members 512 are provided with one flange 514 welded to the corrugated stiffening members 448 prior to their affixation to the skin surface plates 420. Each Z-member extends from rib member to rib member and is provided with a bent over portion 516 which is spot welded to the ribs 422—434.

In assembling the wing flap subassembly to the main wing rib structure, it will be observed in Fig. 20 that at certain points such as 522 (an enlarged section of which is shown in Fig. 23), the main wing rib overlaps the trailing edge assembly rib. At these points angle pieces 524 are provided which are spot welded on the rear faces of the adjacent front plates 462 and 464 of the trailing edge subassembly. In assembling the trailing edge subassembly to the main wing, the tongue portions such as 208 at the rear of the main ribs such as shown in Figs. 7 and 23, are inserted in the slits formed between the front plates 456 and 458, 460 and 462, 464 and 466, etc. and are secured to the plates by means of angle members 526 which are spot welded to both the tongues and the plates. At the points such as 522, the tongues are provided with an extra length which may in addition be spot welded to the flanged rib 426 directly as well as through the angles 424 which have been previously described as secured to the plates 462 and 464. In practice, the angles 526 may be affixed to the plates 456, etc. prior to the assembly of the trailing edge subassembly with the main wing since difficulty might be encountered in gaining access within the wing structure proper for welding. Since the entire bottom of the trailing edge subassembly is open, it is a simple matter to secure the angles to the tongues by spot welds as indicated at 528. At the end, it is likewise a simple matter to spot weld through the plate 527, the flanged rib 422 and the strengthening member 470 so as to secure the parts rigidly together. The plate is in turn welded to the lapped faces of the trimming angle members 529 and 531, which are by their other faces welded to the outside and inside of the skin structure. At the same time, the skin 406 of the top panel of the main wing structure will be found together with a reinforcing strip 530, to overlap the trailing edge subassembly skin surface 420 and its reinforcing strip 476 as well as the flange of angle strip 474. Since the trailing edge assembly is open on the underside, it is a relatively simple matter to secure these five thicknesses by a series of spot welds extending spanwise of the wing.

The aileron trailing edge is also built as a subassembly and is comprised of a plurality of spaced apart rib plates 534—550 having a spacing equivalent to the spacing of the corresponding ribs 78—94 in the main wing structure. Each plate is provided with top and bottom flanges 552 and 554 which are spot welded to top and bottom plates 556 and 558. The lower flange 554 and the lower plate 558 have a proper contour for accommodating a suitable aileron 58 which is only diagrammatically shown in Fig. 1 and each of the plates 534—550 are shaped for this purpose. The top and bottom cover plates 556 and 558 are pinched together at the end by a hook section trim member 560 which may be spot welded to the top plate 556 at 562 and welded through both plates and both sides of the hook at 564. Reinforcing corrugated plates 561 are spot welded to the undersides of the plate 556, each plate extending from rib plate to the adjacent rib plate and each corrugated plate is transversely strengthened by a Z-section member 568. The flange 570 of the Z-member is spot welded to the inner nodes of the corrugated plates, preferably prior to assembly of the plates to the skin 556 and the Z-member has a flap 572 at either end which is spot welded to each adjacent rib plate. In Fig. 31 a top plan view of the aileron trailing edge assembly is shown with parts broken away to show the assembly detail heretofore described. For example, the top plate 556 is cut away showing the corrugated backing plates 561 immediately thereunder and the corrugated backing plate is cut away to show the Z-member 568 located on its under surface.

Completion of the aileron trailing edge assembly is effected by attaching a plurality of panels 574—590 which panels are each provided with flanges 592 and 594 adapted to engage and be spot welded to the rib plates 534—550. The panels are also provided with top and bottom flanges 596 and 598 adapted to be welded to the top and bottom plates 556 and 558. Panels such as 574, 582 and 590 are especially designed to carry pivot brackets diagrammatically shown at 600, 602 and 604 and other aileron control apparatus as will be well understood in the art, and the brackets will extend through the panel and be secured to the main wing structure in any suitable manner.

As will be observed, the flanges 592 and 594 and the plates 574—590 are together with the embraced tongues of the rib plates bent a sufficient amount out of alignment with the rib plates so that upon assembly with the main wing, they will extend parallel to the main wing ribs.

In assembling the aileron trailing edge subassembly to the main wing assembly, it is merely necessary to weld the flanges 592 and 594 and the embraced trailing edge rib plates 534—550 to the main rib plates such as 138', access for this purpose being had through the inspection door indicated by the space A in Fig. 34. At the same time, the top plate 556 of the trailing edge assembly is spot welded to a flat joint strip 606 which has been previously spot welded to the most rearward surface panel of the main wing portion. The lower surface 558 at its forward edge is welded to the channel member 416 which channel member also carries a support 414 for the inspection door and which channel member is, in turn, spot welded to the flanges of the cap strips of the main wing assembly. Where the aileron trailing edge assembly joins the trailing edge flap assembly, the surface panel 556 is provided with a plate 607 overlapping as at 608, the surface 420 of the trailing edge flap assembly and the panel 556 and is welded to all three as well as a part of skin 406 as at 610. The plate 607 may be secured thereto by spot welding since access to this portion of the wing may be had either through the inspection hole A or inspection hole B both of which are provided for gaining access to the aileron controls. A trimming angle piece 612 of proper contour which can be spot welded to the underside of the underplate 558 just prior to assembly to the main wing structure is spot welded to the rib plate 434 of the trailing edge flap assembly.

Figure 36:
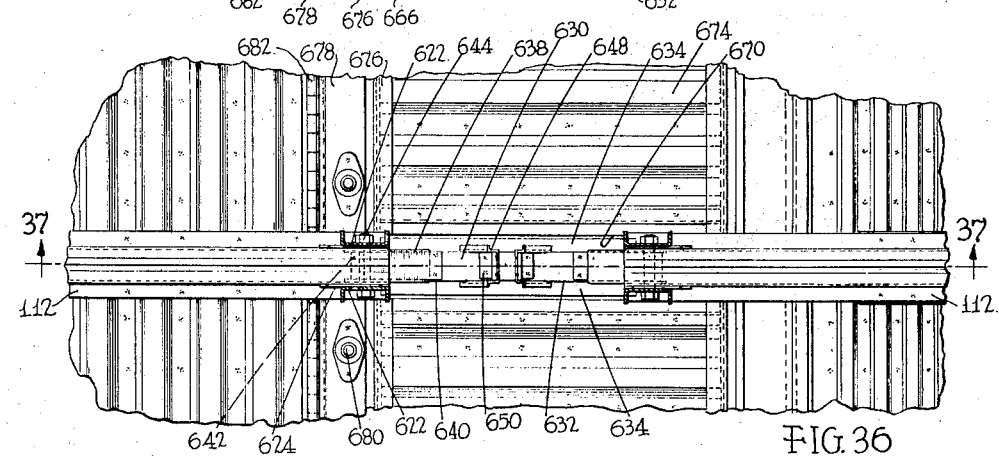
Fig. 36 is a section of Fig. 35 taken on the line 36—36.
Figure 37:
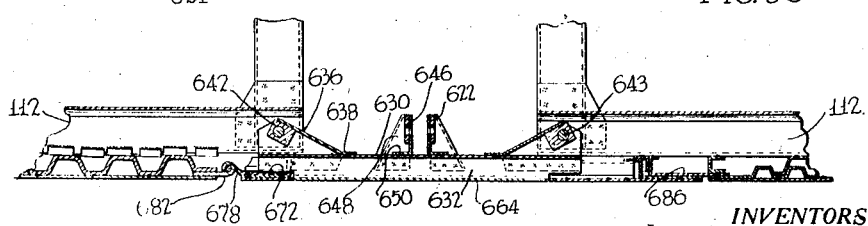
Fig. 37 is a section of Fig. 36 taken on the line 37—37 showing the bomb rack bridge structure.

As shown in Fig. 1, provision is made for a bomb rack indicated at 620, the details of which appear in Figs. 36, 37 and 38. A typical rib is shown having a portion of a bottom cap strip 112 cut away to provide a clear space for the necessary bomb apparatus. The gap in the cap strip 112 is reinforced by a yoke member comprising channel uprights 622 spot welded to the side walls of the top and bottom cap strips through strengthening gusset plates 624 and by the bridge plate 626. The latter plate also is spot welded to the side of the cap strip 110 and forms a gusset plate for the diagonals 124' and 126'. A detachable bridge for the cut away portion of the cap strip 112 is provided, the same comprising a member having a hat shaped section, having a top portion 630, side walls 632 and flanges 634.

For connecting the bridge section to the ends of the cap strip 112, brackets 636 are provided of a generally U-shaped section, the side flanges 638 of which are triangular and spot welded to the side walls 632 of the bridge member. The back portion of the bracket is extended and bent obliquely at 640 so as to afford spot welding to the top 630 on the hat-shaped bridge member. Within the brackets are holes backed by bearing blocks 642, the holes being spaced so as to line up with holes passing through both sides of the cap strip 112 and the bridge is adapted to be held in place by bolts 643. The combined thickness of the upright members 622, gussets 624 and the side walls of the cap strip 112 provide a sufficient thickness so that an adequate bearing for securing bolts 643 is present.

Centrally of the bridge member are provided brackets forming a journal for a control part, the brackets 646 being of channel cross section and having flanged side walls 648 spot welded to the side walls 632 of the bridge and a bent-in portion 650 adapted to be welded to the top 630 of the bridge. The brackets are provided with bosses 662 for the purpose of providing adequate bearing surface. A plate 664 is spot welded to the underside of the removable bridge to the flanges 634, thus completing the bridging structure.

A cover plate or door is provided to necessarily close the aperture and consists of a flat plate 666 having suitable rectangular apertures 670 cut therein of substantially the same size and shape as the bottom portion of the bridge member 630, so that the apertures when properly aligned permit the cover and the bridge member 630 together to completely close the bomb rack aperture. In order to permit the door and the bridge members to form a smooth outward finish, the bridge member is cut away or recessed at either end as at 672 to provide room for the thicknesses of metal present in the door frame. The door plate 664 is stiffened by a plurality of panels of corrugated metal 674 which are secured to the door panel by closely spaced spot welds and by a plurality of short angle members 676 extending along the edges of the corrugated backing member. The members are spot welded to the top nodes of the corrugated members along their edge and to the dor panel 664. On the left hand side, a hinge member 678 is detachably secured to the door frame by means of bolts 680 and the hinge member 678 is in turn hinged upon a complementary hinge member 682 secured to the forward edge of the wing skin. Snap fasteners 684 are provided on the other side of the door in conjunction with a door sill 686 built up adjacent the rear edge of the skin. The door is thus completely removable from the hinge and the bridge members 630 are likewise removable so that all obstruction may be removed to afford access to the bomb apparatus.

A modified form of shear web construction is illustrated in Figs. 38 and 39. In this form each of the shear web panels consists of a corrugated member 700 having secured at both top and bottom edges angle members 702 and 704, one face of each of which is welded to the opposite loops of the corrugated member. The other faces 705 of the angle members are welded together as at 706. The distance between the faces 705 that are welded together at the top and bottom edge of each section corresponds to the distance between the opposite surfaces of the flanges of the cap strips 110 and 112 of the ribs between which the panel is to be inserted.

In assembly a pair of U-shaped channel members are positioned outside of the ribs, one member being adapted to nest within the other to form a flanged box structure. The outer channel member 708 is spot welded to the cap strip flanges as at 710 in the proper position for the shear web and is subsequently welded along its outer side wall 712 to the corrugated skin backing 714, the skin sheet 716 and a narrow build up strip 718, the latter strip merely providing proper spacing between skin 716 and the side wall 712 of the channel member 708 so that subsequently the next section of skin and corrugated backing may be inserted between the skin 716 and channel 712. The angle piece 704 is spot welded to the upper side of the channel member 708 where accessible at every other corrugation as at 706 and thereafter the small channel member 711 is fitted within the large channel member 708 and the faces 705 of the angle strips 702 and 704 are welded together at 713 with both adjacent sides of the channel members 708 and 711. The succeeding layer 720 of skin with its corrugation 722 is thereafter inserted between the side wall 712 of the channel member 708 and the projecting edge of the skin 716 and then the five thicknesses of metal including the side walls of the channel members 708 and 711, the corrugated backing 722 and the skins 716 and 720 are all spot welded together as at 721 at frequent intervals. As in the modification disclosed in Fig. 15, box-like members such as 330 may also be incorporated in the cap strips associated in the present modification in substantially the same manner.

While the wing as so far described, particularly with reference to assembly, adapts itself to sectionalized or subassembly construction capable of final assembly, it may be found desirable to increase the extent of subassembly, since by subassembly methods, production rate can be increased. If desired, the leading edge may be subassembled, by making a subassembling of the nose plates 132 of each of ribs together with the leading edge covering, for example corrugated member 230, 232 and 234, and an appropriate leading edge skin. Such a subassembly structure can be secured to the wing structure proper by merely joining the plates to the rib cap strip and the surface or leading skin to the wing skin proper. For such a subassembly, there would have to be provided an inspection door running the length of the underside of the wing forward of the shear web, in order to gain access for welding, and such a door would be constructed just as the door A shown in Fig. 4, as would be well understood in the art. Such a door may permit the positioning of a full tank, etc., within the wing as well.

While certain thicknesses of metal have been indicated for various parts, it will of course be understood that they may be varied to suit the design and shape and strength requirements. Further, the spacing and size of welds may be varied in order to give the necessary strength, and while for the sake of brevity, each and every weld has not been referred to in detail, it will be understood that spot welds form the major and preferred means of securing all parts together because of increased strength and lightness except where other forms of fastening means are clearly provided. The use of welds provides a smooth flush surface offering a minimum of skin resistance not present in riveted structures, and at high speeds, is of considerable importance.

It, of course, will be also understood that where spot welds are employed, other fastening means may in many instances be substituted for example rivets, however with some loss in weight advantage, and where the invention does not reside in the necessary use of spot welds, reference to the claims should be had for a definition of the limits of the invention.

From the foregoing it will appear that a new and novel wing construction has been devised capable of fabrication from stainless steel or other high strength materials and by spot welding substantially throughout. The weight advantages and the increased strength and corrosion resisting properties of such a construction at once evidence the importance of the novel construction and methods herein disclosed.

Though the description and illustration has been centered around a single embodiment save for variations in certain portions thereof, and assembly methods, it is to be understood that the invention is not limited to the precise disclosure, but may be embodied in many and various equivalent forms and other than the few which have been specifically set forth. As such and many other changes in construction and arrangement of parts may be made without departing from the spirit of the invention, as will be apparent to those skilled in the art, reference will be had to the appended claims for a definition of the limits of the invention.

What is claimed is:

1. In an aerofoil employing corrugated members of uniform pitch and amplitude, a corrugated member having a length from end corrugation to end corrugation different from a multiple of the corrugation pitch, said member comprising a corrugated section having at least one complete corrugation and a flange, another corrugated section having at least one complete corrugation and a flange, said flanges lying in a plane, and a corrugated hat shape intermediary section of differing pitch having the flanges spot welded to said first named section flanges, said overlapped flanges lying within a plane passing through the corrugations on the flange side of said sections, and said hat shape extending to but not beyond the plane passing through the corrugations on the other side from said first named plane.

2. In the method of constructing aerofoils from corrugated metal members and adjusting for standard pitches which provides a wrong dimension between centres of end corrugations, which comprises removing substantially the side walls and intervening base portion of one corrugation, inserting a corrugation of hat shape section and similar strength and of shorter pitch in the space so afforded while overlapping the flanges of the hat shaped members and the adjacent flanges of the severed metal members, and spot welding the flanges together at a series of points along both sets of flanges.

3. The method of attaching a corrugated plate, a cover plate and a flanged rib, which comprises welding attaching plates to corrugation loops on one side of the corrugated plate with portions thereof projecting beyond the loops substantially parallel to the plane of the corrugated plate, and welding said cover plate to corrugation loops on the other side of the corrugated plate, disposing the rib and corrugated plate in adjacent relationship with the rib extending transversely of the corrugations of the corrugated plate and adjacent said attaching plates, and thereafter welding the projecting portions of said attaching plates to said flanged rib.

4. The method of attaching composite corrugated and flat plate sheathing by its corrugated side to a flanged rib member, which comprises affixing a strip having spaced loops formed to project into the corrugations of said corrugated flat plate by electric welding through the flat and corrugated plates and said flanges, and thereafter securing the intermediate portions of said strip to the flange of said rib member by electric welding.

5. The method of fabricating an airplane wing which comprises arranging a plurality of ribs substantially parallel to one another and in proper spaced relation, covering said ribs on the top and bottom along the forward portions with strip material longitudinally extending thereof and adding further strips while working towards the rear on both top and bottom, securing the edges of adjacent strips by electric spot welding and securing the strips to the ribs by spot welding.

6. The method of fabricating an airplane wing which comprises arranging a plurality of ribs substantially parallel to one another and in a position corresponding to their fabricated position, covering said ribs on the top and bottom with strips of material extending transversely to the ribs, and commencing at one end of the ribs and proceeding to approximately the half way point, and assembling a series of shear webs centrally of said ribs substantially at the half way point between each pair of ribs and to the covering thus far completed.

7. The method of fabricating an airplane wing which comprises arranging a plurality of ribs substantially parallel to one another and in a position corresponding to their fabricated position, covering said ribs on the top and bottom with strips of material extending transversely to the ribs, and commencing at one end of the ribs and proceeding to approximately the half way point, assembling a series of shear webs centrally of said ribs between each rib and to the covering thus far completed, and thereafter completing the covering beyond the half way point.

8. In an aerofoil, a plurality of substantially parallel spaced rib members having chords of hat shaped section in opposed relation and diagonal brace members extending therebetween and welded thereto, a portion of a shear web affixed to each rib member comprising a substantially transverse channel member having a web the width of the central portion of said hat shaped chord members, gusset plates attached to the sides of said hat shape chords and to the flanges of said channel members, a pair of substantially Z-shaped members secured to each of the flanges of said channel members, corrugated covering material arranged in strips extending transverse to said ribs, and having a seam substantially in line with the channel members, attaching strips welded to said seam outside of the said ribs and having inwardly extending flanges for receiving corrugated shear web members, and corrugated shear web members having flanges on opposite ends attached to a flange of each of said Z members and having sides secured to said inwardly extending flanges.

9. In an aerofoil the method of assembling a shear web transversely to a plurality of substantially parallel rib members while securing a corrugated sheath to the ribs by spot welding which comprises securing the corrugated sheath to the ribs in strips transverse to said ribs one edge of which is adjacent the position of said shear web, placing a continuous flanged shear web attaching member parallel to said strips on the outside of said ribs, on top and on bottom, securing shear web members between each pair of ribs to said attaching members and securing said attaching members to said sheath strips, with another strip of sheathing on the top and bottom of said ribs by electric welding and thereafter securing said shear web members along their vertical edges to the rib members.

10. The method of securing a trailing edge assembly having a front vertical panel, to a plurality of ribs having vertical forward and aft extending rear rib plates, which comprises inserting said plates thru vertical slits in said panel and spot welding vertical angle members to said panel and projecting portions of said plate beyond said slit.

11. The method of securing a trailing edge assembly having a front vertical panel and a surface structure to a main wing structure having a surface structure and a plurality of ribs with rear vertical fore and aft extending plates which comprises inserting said plates thru corresponding slits in said panel, overlapping said main wing surface structure with the trailing edge surface structure, and spot welding vertical angle pieces to said panel and the rear plates projecting therethru.

12. In an airplane wing of stainless steel spot welded together, a corrugated covering member, and a rib, said rib having a hat shaped section, the flanges of which extend transverse to but adjacent said corrugations, a plurality of substantially flat plates of a width similar to that of the hat shaped section and of a length approximately one and one half times the corrugation pitch, one of said plates being welded through its central portion to each corrugation with its length at right angles to said corrugation, and said plates being welded to the rib flanges, the said plates lying in overlapped relation and each adjacent pair of plates being welded together with the rib flange.

13. In an airplane wing of the stressed skin type, a plurality of ribs, top and bottom skins of non-symmetrical shape about an axis transverse to the line of flight comprising parallel strips extending transverse to said ribs, and a shear web extending from said top and bottom skins and having substantially parallel portions extending parallel to said strips, one of said portions lying forward of the other and being joined to the other by a diagonal portion, whereby the shear web remains substantially central of the non-symmetrical wing surface.

14. In an airplane wing of the stressed skin type and having a leading edge substantially transverse to the line of flight, and a trailing edge at a substantial angle thereto resulting from the gradually decreasing major and minor axis of the aerofoil section as the tip is approached, a shear web having end portions extending substantially transverse to the line of flight, and an offset diagonal portion centrally located, whereby the tip shear web portion may be forwardly located with respect to the root portion to maintain a substantially centrally located shear web throughout the wing.

15. In a wing tip edge adapted for a wing surface having a corrugated backing with corrugations extending substantially transverse to the tip edge, a bridging strap connecting and spot welded to the under loops of the corrugated backing, a U member arranged around the corrugated ends and spot welded to the top loops and said bridging strap, and top and bottom converging plates spot welded to the top and bottom of said U strip, and a thin U trimming edge folded over the adjacent edges of said converging plates and spot welded thereto.

16. In a wing tip edge adapted for a wing surface having a corrugated backing, and supported on spaced flanged ribs, top and bottom converging plates spot welded to said top surface and to straps spot welded to the flanged ribs respectively and a thin U trimming edge folded over the adjacent edges of said converging plates and spot welded thereto.

17. In an aerofoil, the method of assembling a plurality of spaced ribs and a shear web which comprises providing each rib with a portion of said shear web during individual rib fabrication, arranging a set of said ribs for at least a substantial portion of a complete wing in assembled relation to one another, and spot welding a plurality of intermediate shear web portions, between each pair of adjacent ribs and to the portion of shear web of each rib, to thereby provide a continuous integral shear web.

18. A stainless steel airplane wing electrically welded throughout, comprising, a plurality of parallel rib members each having top and bottom chord members and having a flanged section and forward and rear plates and intermediate diagonal braces for tying said chord members together, a shear web extending substantially centrally thru said wing and thru each of the ribs and having a portion thereof integral with said ribs, top and bottom forward cover plates secured to said ribs and said shear web and forward thereof said plates having a corrugated laminar backing graduated in thickness, the thickness decreasing from wing root to tip and from shear web toward the leading edge, top and bottom rear cover plates having a corrugated backing of lighter construction than said forward covering and secured to said ribs, and trailing edge structures comprising a top surface spot welded to said rear top cover plates, and comprising a forward spar panel, said spar panel being secured to said rib plates thru angles spot welded to both, and a bomb rack and aperture formed in said bottom rear cover plates adjacent the root of said wings, the chords of the ribs passing there thru being cut away and provided with a detachable bridge member, and a panel hinged to the adjacent covering adapted to close the bomb rack aperture.

19. In an airplane wing, a plurality of parallel rib members each comprising top and bottom chord members, and each bottom chord member having a gap therein, said gaps being in alignment with one another, a rigidifying yoke structure around each of said bottom chord member gaps and extending to the top chord member, a bridge for each chord gap and means for detachably holding said bridge to each gap end, bottom covering for said ribs extending to the gap, and a panel hinged to said covering adapted to close the gap.

20. An airplane wing rib comprising top and bottom chord members, and interconnecting diagonal braces, said bottom chord member having a short gap therein and upright members on either side of said gap connecting said top and bottom chord members, said upright members being reinforced at the top thereof to form a rigid yoke around said gap, and a bridge for said gap, and means for detachably securing said bridge to the gap ends of said bottom chord member.

21. In an airplane wing, a plurality of spaced ribs, each having a rear vertical and fore and aft extending plate, a plate having top and bottom and end flanges arranged between each pair of adjacent rear plates, a plurality of flanged rib plates, said end flanges being spot welded to said rear plates and said rib plates and said top and bottom flanges being in alignment, top and bottom converging plates spot welded to said top and bottom flanges and the flanges of said rib plates and converging to form a trailing edge, said bottom plate and said rib plates being suitably shaped to receive the forward edge of an aileron.

22. The method in an airplane wing of attaching a corrugated plate, a cover plate and a flanged rib, which comprises securing attaching plates to corrugation loops on one side of the corrugated plate with the portions thereof projecting beyond the loops substantially parallel to the plane of the corrugated plate and said cover plate to corrugation loops on the other side of the corrugated plate, disposing the rib and corrugated plate in adjacent relationship with the rib extending transversely of the corrugations of the corrugated plate and adjacent said attaching plates, and thereafter securing the projecting portions of said attaching plates to said flanged rib.

23. The method in an aircraft wing of assembling a metal skin, a rib and a corrugated metal backing member, the corrugations thereof having spaced tops and spaced bottoms, which consists in first disposing metallic attaching means adjacent the tops of said corrugations in bridging relation with respect to the spaces between said tops, securing said attaching means to the tops of said corrugations, then securing the bottoms of said corrugations to said skin, and finally securing the attaching means to the rib at points between the spaced tops.

24. The method in an aircraft wing of assembling a metal skin, a rib and a corrugated metal backing member in which the corrugations thereof have spaced tops and spaced bottoms, which consists in first disposing a plurality of metal plates in aligned relation on said tops with the ends of adjacent plates overlapping each other at the spaces between the spaced corrugation tops, welding the plates to the corrugation tops, welding the skin to the corrugation bottoms, and finally welding the plates to the ribs at points between the spaced tops.

25. In an aircraft wing, a plurality of parallel rib elements, a skin blanket structure having a metal skin and a corrugated backing secured to said skin through the bottoms of the corrugations thereof, and means for securing said skin blanket structure to each of said rib elements, comprising a plurality of attaching clips secured to the tops of said corrugations, each clip having portions extending at least partially over the spaces between the corrugation top to which it is secured and the adjacent corrugation tops, and overlapping the adjacent clip, the portions of adjacent clips which extend over the space between a pair of adjacent corrugation tops being secured to an adjacent rib.

26. In an aircraft wing, a plurality of parallel rib elements, a skin blanket structure having a metal skin and a corrugated backing secured to said skin through the bottoms of the corrugations thereof, and means for securing said skin blanket structure to each of said rib elements, comprising a plurality of aligned attaching clips secured to the tops of said corrugations, each of said clips having yieldable portions overlapping corresponding portions of adjacent clips to bridge the spaces between adjacent corrugation tops, said overlapping portions being engaged with each other and secured as a unit to an adjacent rib element.

27. In an airplane wing, a pair of adjacent ribs having spaced chords, means interconnecting said chords of each rib and having an attaching portion disposed in a plane parallel to the vertical plane of the rib, and a shear web member extending between said ribs and having vertical flanges parallel to the vertical planes of said ribs disposed at the locations of said ribs, each vertical flange being in engagement with and secured to the attaching portion of the adjacent rib, and top and bottom reinforced skins secured to said chords and to the longitudinal edges of said shear web member.

28. In an aircraft wing structure having a plurality of spaced ribs, metal skin coverings for the top and bottom sides thereof and a spanwise extending shear web dividing the structure into a leading load-carrying portion and a trailing portion and having a plurality of vertical rib-receiving openings of the same spacing as said ribs, the method of assembly which consists in first, while holding the ribs in properly spaced relation, covering said forward portion only with said skins by securing said skins to said ribs, disposing the shear web adjacent the trailing ends of said ribs with the openings thereof in alignment with said ribs, moving the shear web forwardly to a position between the trailing edges of said forward-portion skins, and then welding said shear web to the sides of said ribs.

29. In an aircraft wing structure having a plurality of spaced ribs, metal skin coverings for the top and bottom sides thereof and a spanwise extending shear web dividing the structure into a leading load-carrying portion and a trailing portion and having a plurality of vertical rib-receiving openings of the same spacing as said ribs, the method of assembly which consists in first, while holding the ribs in properly spaced relation, covering said forward portion only with said skins by securing said skins to said ribs, disposing the shear web adjacent the trailing ends of said ribs with the openings thereof in alignment with said ribs, moving the shear web forwardly to a position between the trailing edges of said forward portion skins, welding said shear web to the sides of said ribs and thereafter covering said trailing portion with the trailing portion skins and securing the leading edges of said last-named skins to the trailing edges of said forward-portion skins.

30. The steps in the assembly of a metal aircraft wing structure having a plurality of spaced ribs, top and bottom skins, and a spanwise-extending shear web member intersecting the ribs intermediate their forward and trailing ends and dividing the structure into a forward load-carrying portion and a trailing portion, of first, while holding a plurality of ribs in substantially parallel spaced relation, securing forward portion top and bottom to the ribs, disposing the shear web in position, securely attaching the shear web to the ribs adjacent the trailing edges of said skins, and thereafter completing the trailing portion of the structure by securing top and bottom trailing-portion skins in position.

31. In an airplane wing, a plurality of substantially parallel ribs, each rib having spaced top and bottom chords and a vertical member extending between and joined to said top and bottom chords intermediate the ends thereof, said member having spaced flange portions extending substantially from chord to chord of the rib, each flange portion lying in a plane substantially parallel to the plane of the rib, and a shear web member extending between adjacent ribs and having spaced vertical flanges disposed parallel to said flange portions and each vertical flange being in abutting engagement with and secured to one of the said flange portions.

32. In an airplane wing, a plurality of substantially parallel ribs, each rib having spaced top and bottom chords and a vertical member extending between and joined to said top and bottom chords intermediate the ends thereof, said member having spaced flange portions extending substantially from chord to chord of the rib, each flange portion lying in a plane substantially parallel to the plane of the rib, and a shear web member extending between adjacent ribs and having spaced vertical flanges disposed parallel to said flange portions and each vertical flange being in abutting engagement with and secured to one of the said flange portions, and top and bottom metal skins secured to said chords and to the longitudinal edges of said shear web member.

JOHN C. WHITESELL, Jr.
RENATO CONTINI.
WILLIAM W. FARR.
KAREL J. BOSSART.
EDMUND T. RIDGWAY.
WILLIAM L. DIETER.